US012586302B2

(12) United States Patent
Pan

(10) Patent No.: US 12,586,302 B2
(45) Date of Patent: Mar. 24, 2026

(54) RENDERING HAIR

(71) Applicant: Tencent Technology (Shenzhen) Company Limited, Shenzhen (CN)

(72) Inventor: Xiaoyu Pan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 182 days.

(21) Appl. No.: 18/605,513

(22) Filed: Mar. 14, 2024

(65) Prior Publication Data

US 2024/0221293 A1    Jul. 4, 2024

Related U.S. Application Data

(63) Continuation of application No. PCT/CN2023/121023, filed on Sep. 25, 2023.

(30) Foreign Application Priority Data

Oct. 18, 2022    (CN) .......................... 202211271651.5

(51) Int. Cl.
G06T 15/04         (2011.01)
G06T 15/50         (2011.01)
G06T 15/60         (2006.01)

(52) U.S. Cl.
CPC ............ G06T 15/506 (2013.01); G06T 15/04 (2013.01); G06T 15/60 (2013.01); *G06T 2215/12* (2013.01)

(58) Field of Classification Search
CPC ....... G06T 15/506; G06T 15/04; G06T 15/60; G06T 2215/12; G06T 15/005; G06T 13/40; G06T 15/06; G06V 10/80
See application file for complete search history.

(56) References Cited

U.S. PATENT DOCUMENTS

2011/0304623 A1*   12/2011   Tamstorf ............... G06T 15/506
                                                          345/426

OTHER PUBLICATIONS

Marschner et al., 2003, "Light Scattering from Human Hair Fibers" (Year: 2003).*
Xu et al., 2011, "Interactive Hair Rendering and Appearance Editing under Environment Lighting." (Year: 2011).*
Yuksel et al., 2009, "Hair Meshes." (Year: 2009).*
Zinke et al., "Light Scattering from Filaments." (Year: 2007).*

* cited by examiner

*Primary Examiner* — Daniel F Hajnik
*Assistant Examiner* — Adeel Bashir
(74) *Attorney, Agent, or Firm* — ARENTFOX SCHIFF LLP

(57)        ABSTRACT

In a method, a longitudinal angle, an azimuthal angle, illumination information, and color information of a pixel in a hair area of a virtual image corresponding to each optical path of a virtual main light source are obtained. For each optical path of the virtual main light source, a respective longitudinal scattering amount is determined based on the longitudinal angle and the illumination information of the pixel, a respective azimuthal scattering amount is determined based on the azimuthal angle of the pixel, and a respective scattering amount of the pixel corresponding to the respective optical path is determined according to the longitudinal scattering amount, the azimuthal scattering amount, and the color information of the pixel. Scattering amounts of the pixel corresponding to the optical paths of the virtual main light source are fused to obtain first coloring information of the pixel corresponding to the virtual main light source.

20 Claims, 12 Drawing Sheets

202

Obtain main light source information of a virtual main light source disposed in a virtual environment, the main light source information including a light source position and a light source direction that change with time, and the virtual main light source acting on a hair area of a virtual image

204

Obtain a longitudinal angle, an azimuthal angle, illumination information, and color information that are of a pixel in the hair area corresponding to each optical path of the virtual main light source, optical paths of the virtual main light source including a reflection optical path, a transmission transmission optical path, and a transmission reflection transmission optical path

206

Determine, for each optical path, a longitudinal scattering amount based on the corresponding longitudinal angle and the corresponding illumination information of the pixel, determine an azimuthal scattering amount based on the corresponding azimuthal angle, and determine a scattering amount of the pixel corresponding to the optical path according to the longitudinal scattering amount, the azimuthal scattering amount, and the corresponding color information

208

Fuse scattering amounts of the pixel corresponding to the optical paths to obtain coloring information of the pixel corresponding to the virtual main light source, the coloring information being configured for rendering hair of the virtual image

FIG. 2

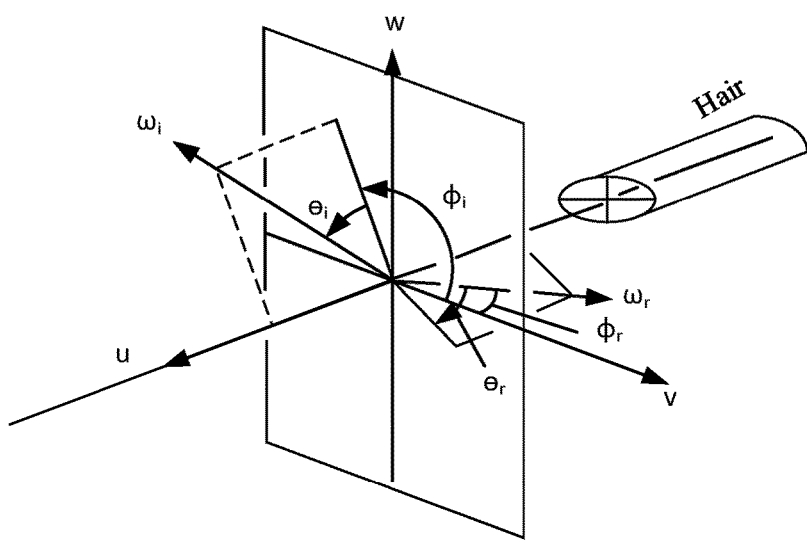

FIG. 3

Effect of a transmission
transmission optical path

Effect obtained through superimposition
of a plurality of optical paths

Rendering effect of a reflection optical path

Rendering effect of a transmission reflection transmission optical path

Rendering effect obtained through superimposition of a plurality of optical paths Sub-picture 1: color 1    Sub-picture 2: color 2    Sub-picture 3: color 3

Sub-picture 4: color 4    Sub-picture 5: color 5    Sub-picture 6: color 6

Sub-picture 7: color 7    Sub-picture 8: color 8    Sub-picture 9: color 9    Sub-picture 10: color 10

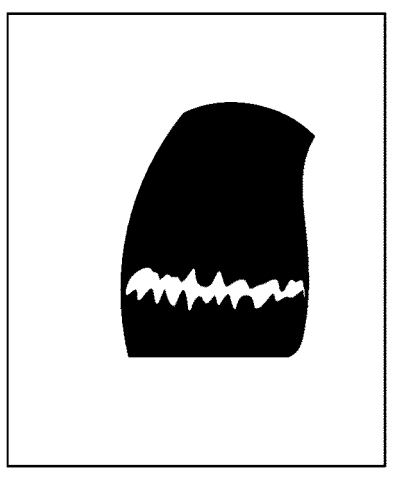
Rendering effect of a Kajiya-kay
illumination model
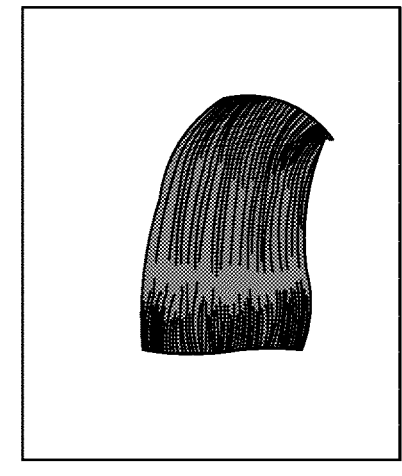
Real hair
FIG. 11
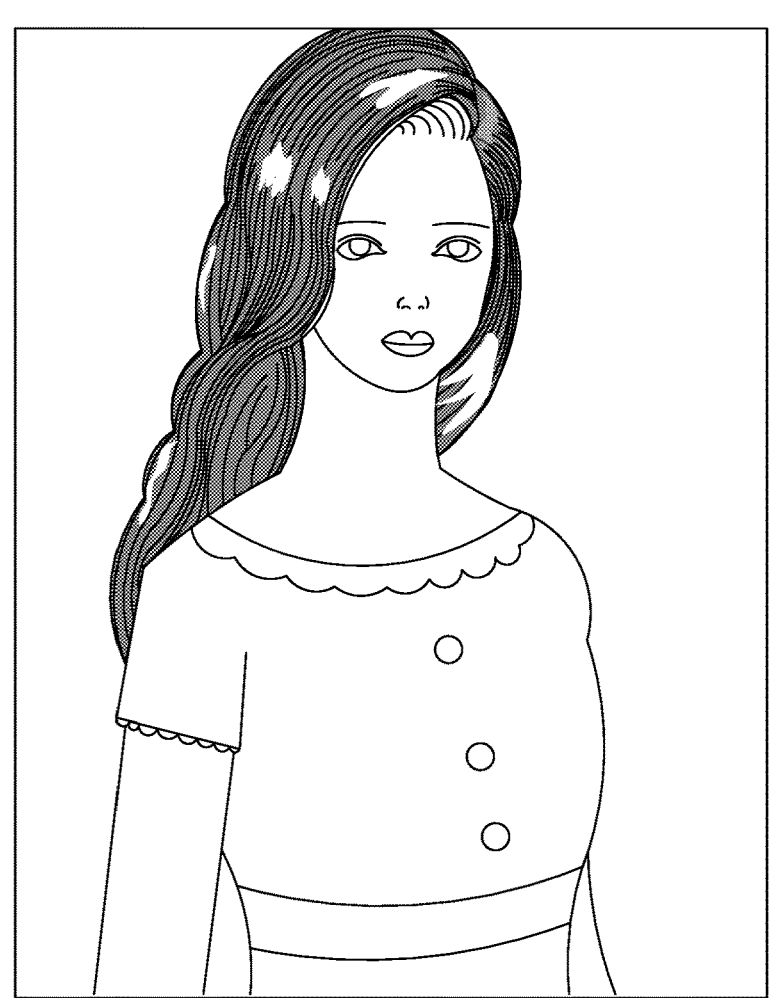
FIG. 12

Hair color of
rendered hair is
color 1

Clothing color
is color 1

Sub-picture 1      Sub-picture 2        Sub-picture 3

RENDERING HAIR

RELATED APPLICATIONS

The present application is a continuation of International Application No. PCT/CN2023/121023, entitled "HAIR RENDERING METHOD AND APPARATUS, DEVICE, STORAGE MEDIUM, AND COMPUTER PROGRAM PRODUCT" and filed on Sep. 25, 2023, which claims priority to Chinese Patent Application No. 202211271651.5, entitled "HAIR RENDERING METHOD AND APPARA- TUS, DEVICE, STORAGE MEDIUM, AND COMPUTER PROGRAM PRODUCT" and filed on Oct. 18, 2022. The entire disclosures of the prior applications are hereby incor- porated by reference in their entirety.

FIELD OF THE TECHNOLOGY

This application relates to the field of computer technolo- gies, including hair rendering.

BACKGROUND OF THE DISCLOSURE

With the development of image processing technologies, picture quality of games is getting higher and higher. To achieve a realistic effect of hair of a virtual character in a mobile phone game, the hair of the virtual character is often colored and rendered by using a Kajiya-kay (Kajiya model) illumination model. That is, the hair is simulated and mod- eled as an opaque cylinder and colored through a reflection principle.

However, real hair is a translucent cylinder. After the Kajiya-kay illumination model is used to color the virtual hair, a coloring effect of the virtual hair may be relatively stiff and shiny, and may not simulate actual gloss of real hair. That is, there is a problem of a poor rendering effect of the hair of the virtual character.

SUMMARY

According to an aspect of the disclosure, a hair rendering method is provided. In the method, main light source information of a virtual main light source disposed in a virtual environment is obtained. The main light source information includes a light source position and a light source direction of the virtual main light source that change with time, and the virtual main light source acts on a hair area of a virtual image. A longitudinal angle, an azimuthal angle, illumination information, and color information of a pixel in the hair area are obtained corresponding to each optical path of the virtual main light source. Each optical path of the virtual main light source includes a respective reflection optical path, a respective transmission optical path, and a respective transmission reflection transmission optical path. For each optical path of the virtual main light source, a respective longitudinal scattering amount is deter- mined based on the corresponding longitudinal angle of the pixel and the corresponding illumination information of the pixel. A respective azimuthal scattering amount is deter- mined based on the corresponding azimuthal angle of the pixel. A respective scattering amount of the pixel corre- sponding to the respective optical path is determined accord- ing to the longitudinal scattering amount, the azimuthal scattering amount, and the corresponding color information of the pixel. Scattering amounts of the pixel corresponding to the optical paths of the virtual main light source are fused to obtain first coloring information of the pixel corresponding to the virtual main light source. Hair in the hair area of the virtual image being rendered based on the first coloring information.

According to another aspect of the disclosure, a hair rendering apparatus is provided. The apparatus includes processing circuitry. The processing circuitry is configured to obtain main light source information of a virtual main light source disposed in a virtual environment. The main light source information includes a light source position and a light source direction of the virtual main light source that change with time, and the virtual main light source acts on a hair area of a virtual image. The processing circuitry is configured to obtain a longitudinal angle, an azimuthal angle, illumination information, and color information of a pixel in the hair area corresponding to each optical path of the virtual main light source, where each optical path of the virtual main light source includes a respective reflection optical path, a respective transmission optical path, and a respective transmission reflection transmission optical path. The processing circuitry is configured to determine, for each optical path of the virtual main light source, (i) a respective longitudinal scattering amount based on the corresponding longitudinal angle of the pixel and the corresponding illu- mination information of the pixel, (ii) a respective azimuthal scattering amount based on the corresponding azimuthal angle of the pixel, and (iii) a respective scattering amount of the pixel corresponding to the respective optical path according to the longitudinal scattering amount, the azi- muthal scattering amount, and the corresponding color information of the pixel. The processing circuitry is config- ured to fuse scattering amounts of the pixel corresponding to the optical paths of the virtual main light source to obtain first coloring information of the pixel corresponding to the virtual main light source. Hair in the hair area of the virtual image is rendered based on the first coloring information.

Aspects of the disclosure also provide a non-transitory computer-readable storage medium storing instructions which, when executed by a processor, cause the processor to perform any of the described methods for hair rendering.

BRIEF DESCRIPTION OF THE DRAWINGS

Further features, the nature, and various advantages of the disclosed subject matter will be more apparent from the following detailed description and the accompanying draw- ings in which:

FIG. 2 is a schematic flowchart of a hair rendering method according to an embodiment.

FIG. 3 is a schematic diagram of symbols of a scattering geometry according to an embodiment.

FIG. 11 is a schematic diagram of a comparison between a rendering effect of a Kajiya-kay illumination model and real hair according to an embodiment.

FIG. 12 is a schematic diagram of a hair rendering effect according to an embodiment.

DESCRIPTION OF EMBODIMENTS

Figure 1:
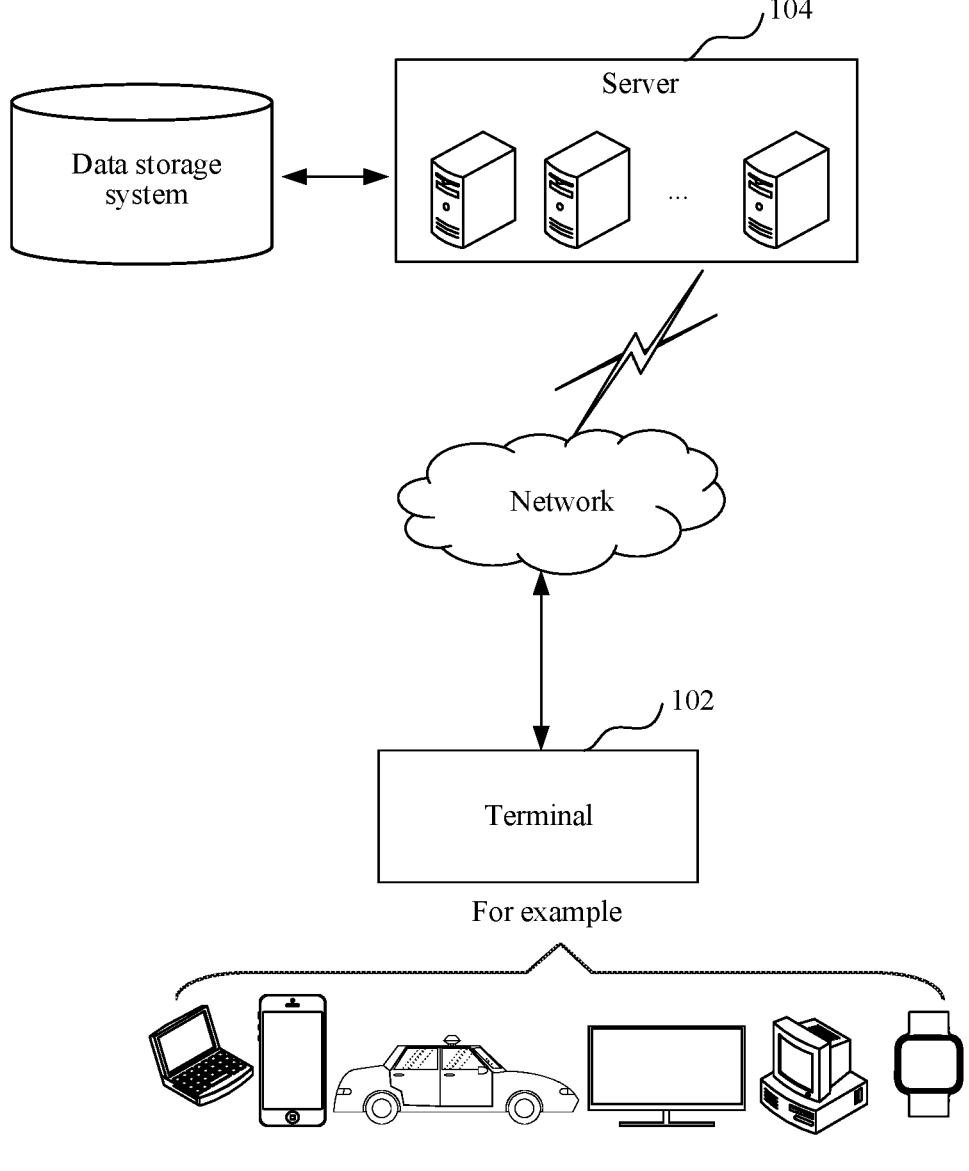
FIG. 1 is a diagram of an application environment of a hair rendering method according to an embodiment.

The technical solutions in the embodiments of the disclosure are described below with reference to the accompanying drawings in the embodiments of the disclosure. The described embodiments are merely some rather than all of the embodiments of the disclosure.

To facilitate understanding, examples of relevant concepts are first explained.

Tangent can indicate a tangent direction. The tangent direction can refer to a direction of a hair. For example, the tangent direction can be a direction from a tail of the hair to a root of the hair. For another example, the tangent direction can be direction from the root of the hair to the tail of the hair.

Scattering can indicate an optical phenomenon in which light rays are scattered in all directions caused by inhomogeneity of a propagation medium.

Reflection can be an optical phenomenon in which light, when propagating to different materials, changes a propagation direction at an interface and returns to an original material. Light is reflected when encountering water, glass, and many other object surfaces. A phenomenon in which light changes a propagation direction at an interface of two substances and returns to an original substance is referred to as reflection of light.

Refraction can be an optical phenomenon. When light is incident obliquely from one transparent medium into another transparent medium, a propagation direction generally changes. This phenomenon is referred to as refraction of light.

Transmission can be an optical phenomenon. When light is incident on a surface of a transparent or translucent material, part of the light is reflected, part of the light is absorbed, and part of the light may be transmitted. In this case, transmission is an emission phenomenon of incident light after refraction and passing through the object. The transmitted object is a transparent or translucent object, such as glass or a color filter.

Illumination model can be a computer model that simulates a physical process of light illumination in nature according to relevant laws of optics. Illumination models in computer graphics are divided into local illumination models and global illumination models. The local illumination model ignores an impact of a surrounding environment on an object, and considers a direct illumination effect of a light source on an object surface. This is an ideal situation, and results obtained are somewhat different from the real situation in nature. The global illumination model takes into account the impact of the surrounding environment on the object surface.

Light source can be an object that emits electromagnetic waves in a certain wavelength range (including visible light and invisible light such as ultraviolet, infrared and X-rays), and usually refers to an object that can emit visible light. Light sources are divided into natural light sources (that is, natural light sources, such as the sun) and artificial light sources (such as electric lamps).

Optical path can be a propagation path of light, which, in the disclosure, simulates a propagation path of light on hair.

R (Reflection or reflection optical path) can indicate a reflection path of light, which, in the disclosure, may be understood as simulating an optical path on which light is reflected on hair.

TT (Transmission Transmission or transmission transmission optical path) can indicate a light path through which light penetrates an object and emerges from inside the object, which, in the disclosure, simulates an optical path on which light is first transmitted into hair and then transmitted again (that is, transmitted from inside of the hair) when light is propagated on the hair. In this case, the light undergoes two transmission processes.

TRT (Transmission Reflection Transmission or transmission reflection transmission optical path) can indicate a process in which light penetrates into an object and then is internally reflected and transmitted out of the object, which, in the disclosure, simulates an optical path on which light is reflected once inside hair (in this case, the light is still inside the hair), and then transmitted again (that is, transmitted out from inside of the hair) when light is propagated on the hair. In this case, the light undergoes two times of transmission and one reflection. The first transmission is the process of the light entering the hair from the air, the reflection is the process of the light propagating in the hair, and the second transmission is the process of the light entering the air from the hair.

Longitudinal angle can indicate an angle between a vector projected on a normal plane and an angle on the normal plane perpendicular to a tangent.

Azimuthal angle can indicate an angle between a vector projected on a normal plane and a reference vector on the same plane.

Anisotropy can refer to a fact that all or part of chemical, physical, and other properties of a substance change as a direction changes, showing different properties in different directions. Anisotropy is a common property in materials and media that varies greatly in scale. Crystals, various materials in daily life, and earth media all have anisotropy. Anisotropy and nonuniformity are descriptions of matter from two different perspectives and cannot be equated.

In the related art, in a process of rendering a mobile phone game, to color hair of a virtual character, the hair is modeled as an opaque cylinder and colored using a reflection principle. This coloring method is implemented through a Kajiya-kay illumination model. Because the model is not rendered based on a structure of real hair, the hair rendering effect is stiff and the glossy part is shiny. Therefore, by using the Kajiya-kay illumination model, a realistic hair rendering effect cannot be obtained.

According to the hair rendering method provided in the embodiments of the disclosure, the main light source information of the virtual main light source disposed in the virtual environment is obtained, where the main light source information includes a light source position and a light source direction that change with time, and the virtual main light source acts on the hair area of the virtual image. The optical paths of the virtual main light source include a reflection optical path, a transmission transmission optical path (or transmission optical path), and a transmission reflection transmission optical path. A longitudinal angle, an azimuthal angle, illumination information, and color information that are of the pixel in the hair area corresponding to each optical path of the virtual main light source are obtained. For each optical path, a longitudinal scattering amount is determined based on the corresponding longitudinal angle and the corresponding illumination information, which can accurately predict the scattering situation of the pixel in the longitudinal scattering process. The azimuthal scattering amount can be directly determined based on the corresponding azimuthal angle, thereby accurately predicting the scattering situation of the pixel in the azimuthal scattering process. A scattering amount of the pixel corresponding to an optical path is determined according to a longitudinal scattering amount, an azimuthal scattering amount, and corresponding color information. In this way, based on longitudinal scattering, azimuthal scattering, and color information, gloss of the pixel in each optical path can be authentically simulated. Finally, scattering amounts of the pixel corresponding to the optical paths are fused to obtain coloring information of the pixel corresponding to the virtual main light source, realizing realistic and efficient rendering of the hair of the virtual character, and improving the hair rendering effect.

The hair rendering method provided in the embodiments of the disclosure can be applied to an application environment as shown in FIG. 1. A terminal 102 communicates with a server 104 through a network. A data storage system may store data that the server 104 needs to process. The data storage system may be integrated on the server 104, or placed on a cloud or other servers. Both the terminal 102 and the server 104 can be used individually to perform the hair rendering method provided in the embodiments of the disclosure. The terminal 102 and the server 104 can also be used cooperatively to perform the hair rendering method provided in the embodiments of the disclosure. An example is used for description in which the terminal 102 and the server 104 can be used cooperatively to perform the hair rendering method provided in the embodiments of the disclosure. The terminal 102 can run a client, and the server 104 is a backend server that can provide computing services and storage services for the client.

In some embodiments, the server 104 obtains main light source information of a virtual main light source disposed in a virtual environment, the main light source information including a light source position and a light source direction that change with time, and the virtual main light source acting on a hair area of a virtual image. The server 104 obtains a longitudinal angle, an azimuthal angle, illumination information, and color information that are of a pixel in the hair area corresponding to each optical path of the virtual main light source, optical paths of the virtual main light source including a reflection optical path, a transmission transmission optical path, and a transmission reflection transmission optical path. For each optical path, the server 104 determines a longitudinal scattering amount based on the corresponding longitudinal angle and the corresponding illumination information of the pixel, determines an azimuthal scattering amount based on the corresponding azimuthal angle, and determines a scattering amount of the pixel corresponding to the optical path according to the longitudinal scattering amount, the azimuthal scattering amount, and the corresponding color information. The server 104 fuses scattering amounts of the pixel corresponding to the optical paths to obtain coloring information of the pixel corresponding to the virtual main light source, the coloring information being configured for rendering hair of the virtual image. In some embodiments, the server 104 may further generate rendering data of the hair based on the coloring information. When the terminal 102 has hair rendering needs, the server 104 sends the rendering data to the terminal 102, and the terminal 102 renders and displays the hair of the virtual image according to the rendering data through the running client. In some embodiments, the server 104 may alternatively deliver the rendering data to the terminal 102 in advance. The terminal 102 stores the rendering data locally, and renders and displays the hair of the virtual image according to the locally stored rendering data when there is a need for hair rendering. For example, when the terminal 102 needs to render a virtual image in a game picture, needs to provide hair parts of the virtual image, or needs to generate a virtual image, the terminal can render and display the hair of the virtual image according to the locally stored rendering data.

The client running on the terminal 102 may be a game application, a video application, a social application, an instant messaging application, a navigation application, a music application, a shopping application, an electronic map application, a browser, and other clients with a function of displaying virtual images. The client may be an independent application or a sub-application integrated in a specific client (for example, a social client or a travel client), which is not limited herein.

The terminal 102 may be, but is not limited to, various personal computers, laptops, smartphones, tablets, Internet of Things devices, and portable wearable devices. The Internet of Things devices may be smart televisions, smart in-vehicle devices, and the like. The portable wearable devices may be smart watches, smart bracelets, head-mounted devices, and the like. The server 104 may be implemented by an independent server or a server cluster formed by a plurality of servers.

In some embodiments, as shown in FIG. 2, a hair rendering method is provided, and the method is applied to a computer device (such as the terminal 102 or the server 104 in FIG. 1), including the steps as follows.

At step 202, main light source information of a virtual main light source disposed in a virtual environment can be obtained, where the main light source information can include a light source position and a light source direction that change with time, and the virtual main light source acting on a hair area of a virtual image.

The virtual environment is a virtual environment generated by the computer. The virtual environment may be a three-dimensional environment that simulates real events, a fictional three-dimensional environment, or a semi-fictional and semi-real three-dimensional scene.

The virtual main light source is a light source that is mainly used to emit light in the virtual environment. The main light source is a light source that simulates a light emitting principle of the sun. It may be understood that the light emitted by the virtual main light source is parallel light. Therefore, the virtual main light source can be regarded as sunlight in the virtual environment. For example, there is a light source in the virtual environment, that is, the virtual main light source, and the virtual environment is illuminated by the virtual main light source. For example, there may be various light sources in the virtual environment, including the virtual main light source, street lights, vehicle lights, and the like.

As time changes, a position and a light source direction of the virtual main light source in the virtual environment change. Therefore, the virtual main light source is simulated in the virtual environment through the main light source information.

In some embodiments, the position of the virtual main light source is set by simulating a position of the sun at a specific moment. In some embodiments, the position of the virtual main light source may be the east of the virtual environment. In some embodiments, the position of the virtual main light source may be determined in conjunction with time set in the virtual environment. For example, when the time set in the virtual environment is morning, or a set time period is a morning period, the virtual main light source is set to the east in the virtual environment. When the time set in the virtual environment is noon, the virtual main light source is set to the south in the virtual environment. When the virtual environment is set in the evening, the virtual main light source is set to the west in the virtual environment. The light source direction refers to a direction in which the virtual main light source emits light. For example, the light source direction is a direction facing a face of the virtual image. The light source direction of the virtual main light source is also set by simulating an illumination direction of the sun at a specific moment.

The virtual image is a non-realistic, software-produced three-dimensional model used in the virtual environment. In a game scene, a virtual image may be a virtual character in the game. In a multimedia scenario, a virtual image may be a virtual character in an animation or a movie. To make the virtual image more realistic, the hair of the virtual object (or virtual image) needs to be rendered. In an aspect, the disclosure can also be applied to animals. In this case, in the embodiments of the disclosure, hair of an animal can be rendered, that is, the hair of the virtual object is regarded as the hair of the animal. In a display interface, the virtual image is displayed through pixels, and an area where the pixels displaying the virtual image are located is regarded as the hair area of the virtual image.

In some embodiments, the computer device obtains main light source information of a virtual main light source disposed in a virtual environment, where the main light source information includes a light source position and a light source direction that change with time. The computer device simulates the virtual main light source in the virtual environment in real time according to the light source position and the light source direction.

For example, the computer device obtains the main light source information at the current moment, and simulates the virtual main light source in the virtual environment according to the main light source information. The virtual main light source acts on the hair area of the virtual image.

At step 204, a longitudinal angle, an azimuthal angle, illumination information, and color information of a pixel in the hair area corresponding to each optical path of the virtual main light source can be obtained. The optical paths of the virtual main light source can include a reflection optical path, a transmission transmission optical path, and a transmission reflection transmission optical path.

The longitudinal angle is an angle between a vector and a projection of the vector on a normal plane of the hair. The azimuthal angle is an angle between a vector projected on the normal plane and a reference vector on the normal plane. The normal plane refers to a plane that passes through a tangent point of a space curve and is perpendicular to a tangent, that is, a plane that is perpendicular to the tangent at the point. FIG. 3 is a schematic diagram of symbols of a scattering geometry. A normal plane of hair is a plane formed by a w axis and a v axis. u is a tangential vector of the hair. The direction is from a hair root to a hair tail. The tangential vector is a curve. The tangential vector is a tangential vector of the curve at a point, which may be understood as a vector along the tangent direction of the curve at the point. A vector v and a vector w form a right-handed orthogonal basis, with the v-w plane as the normal plane. $\omega_i$ is a vector of an illumination direction, and $\omega_r$ is a vector of a scattering direction. $\theta_i$ and $\theta_r$ are both longitudinal angles, $\theta_i$ is an angle between a vector projected by $\omega_i$ on the normal plane and $\omega_i$, that is, an inclination angle between the illumination direction and the normal plane, which may be understood as an incident longitudinal angle. $\theta_r$ is an angle between a vector projected by $\omega_r$ on the normal plane and $\omega_r$, that is, an inclination angle between the scattering direction and the normal plane, which may be understood as a scattering longitudinal angle. $\phi_i$ and $\phi_r$ are both azimuthal angles. $\phi_i$ is an angle between the vector projected by $\omega_i$ on the normal plane and the vector v, which may be understood as an incident azimuthal angle. $\phi_r$ is an angle between the vector projected by $\omega_r$ on the normal plane and the vector v, which may be understood as a scattering azimuthal angle.

Figure 4:
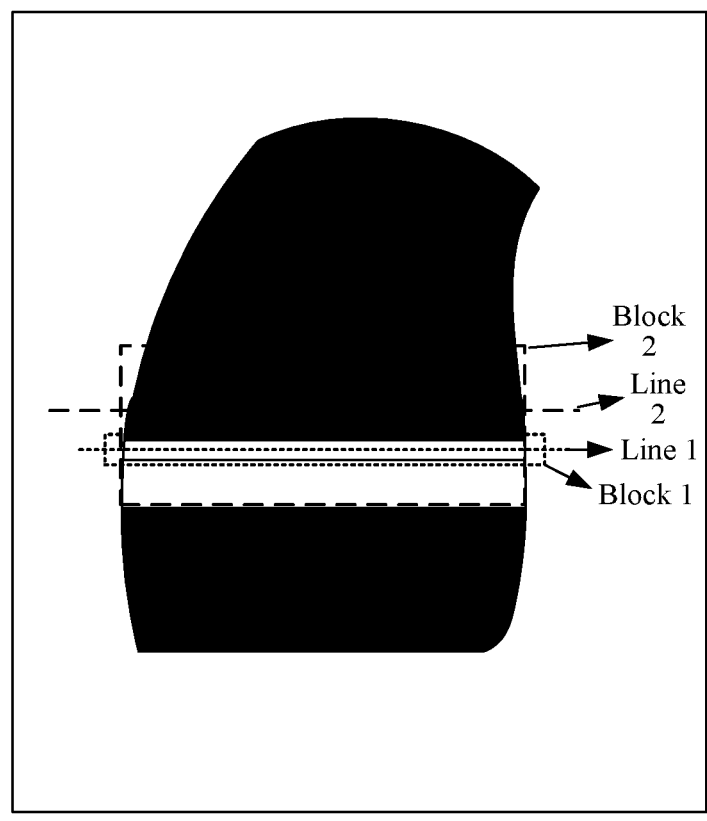
FIG. 4 is a schematic diagram of illumination information in different optical paths according to an embodiment.

The illumination information is configured for reflecting gloss of pixels, that is, light that the human eye can perceive. The illumination information includes two parameters: an offset mean and a variance width term. The offset mean reflects a position of a halo on the hair. The halo may be understood as a highlight of the hair, which represents luster of the hair. The offset mean mainly affects the illumination position. The offset mean of different values changes the position of the halo on the hair. The variance width term reflects a width of the halo on the pixels, that is, an illumination width. The larger the variance width term, the wider the halo. The wider the width, the darker the scattered brightness, and the rougher the hair looks. FIG. 4 is a schematic diagram of illumination information in different optical paths. FIG. 4 shows an example of illumination information of a reflection optical path and a transmission reflection transmission optical path. A line 1 in FIG. 4 is an offset mean of the reflection optical path, a box 1 is a variance width term of the reflection optical path, a line 2 is an offset mean of the transmission reflection transmission optical path, and a box 2 is a variance width term of the transmission reflection transmission optical path. As can be learned from FIG. 4, the offset mean affects a position of scattered light, and the variance width term affects a scattering range.

Figure 5:
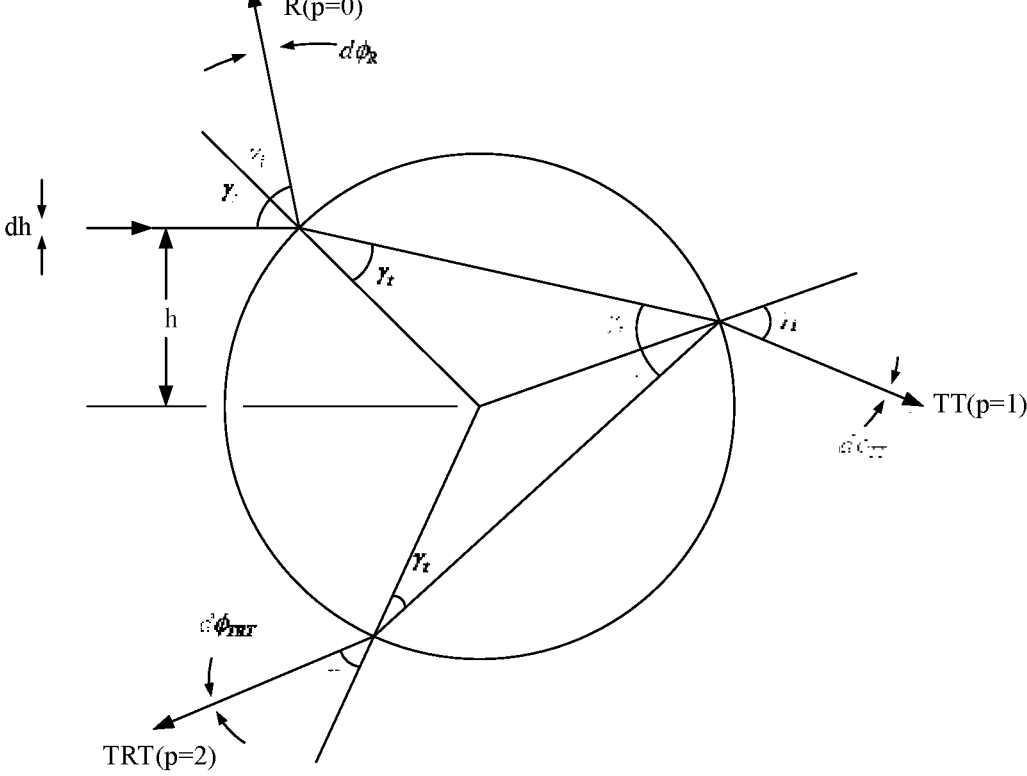
FIG. 5 is a schematic diagram of a geometric shape of circular cross-section scattering according to an embodi- ment.

The color information is configured for reflecting the color of the pixel. The color information includes chroma information, brightness information, and saturation information of the pixel. The chroma information reflects the hue of the color of the pixel. The brightness information reflects the lightness and darkness of the color of the pixel, and the saturation information reflects the vividness of the color of the pixel. The optical paths of the virtual main light source at this pixel includes a reflection optical path, a transmission transmission optical path, and a transmission reflection transmission optical path. FIG. 5 is a schematic diagram of a geometric shape of circular cross-section scattering. Incident light is incident on a circular object with incident energy dh and an incident angle $\gamma_i$. A height difference between the incident light and a center of the circle is h. There are now three optical paths. For a reflection optical path R, emergent light emits with emission energy $d\phi_R$ and an emission angle $\gamma_i$. In this case, the reflection optical path does not involve propagation inside the hair, so that a number P of segments of the path inside the hair is 0. The number of segments of the internal path refers to a number of changes of the optical path inside the hair. For a transmission transmission optical path TT, the light passes through the circular object and emerges from inside of the circular object. In this case, after the optical path is incident into the hair at the incident angle $\gamma_i$, the light is transmitted inside at a refraction angle $\gamma_t$, and then emitted with the emission energy $d\phi_{TT}$ and the emission angle $\gamma_i$. In this case, the number P of segments of the internal path is 1. For a transmission reflection transmission optical path TRT, light penetrates the circular object, and then the light entering the circular object is reflected inside the object and then emerges from inside of the circular object. In this case, after the optical path is incident into the hair at the incident angle $\gamma_i$, the light is transmitted inside at the refraction angle $\gamma_t$. After the light is reflected at an angle $\gamma_t$ inside the hair, the light is emitted with the emission energy $d\phi_{TRT}$ and the emission angle $\gamma_i$. In this case, the number P of segments of the internal path is 2.

In some embodiments, the computer device obtains a longitudinal angle, an azimuthal angle, and color information that are of a pixel in the hair area corresponding to each optical path of the virtual main light source are obtained. In response to a trigger operation on the illumination information, the computer device obtains inputted illumination information of each optical path. Alternatively, the computer device determines the illumination information of each optical path based on at least one of a virtual image and a virtual scene.

Figure 6:
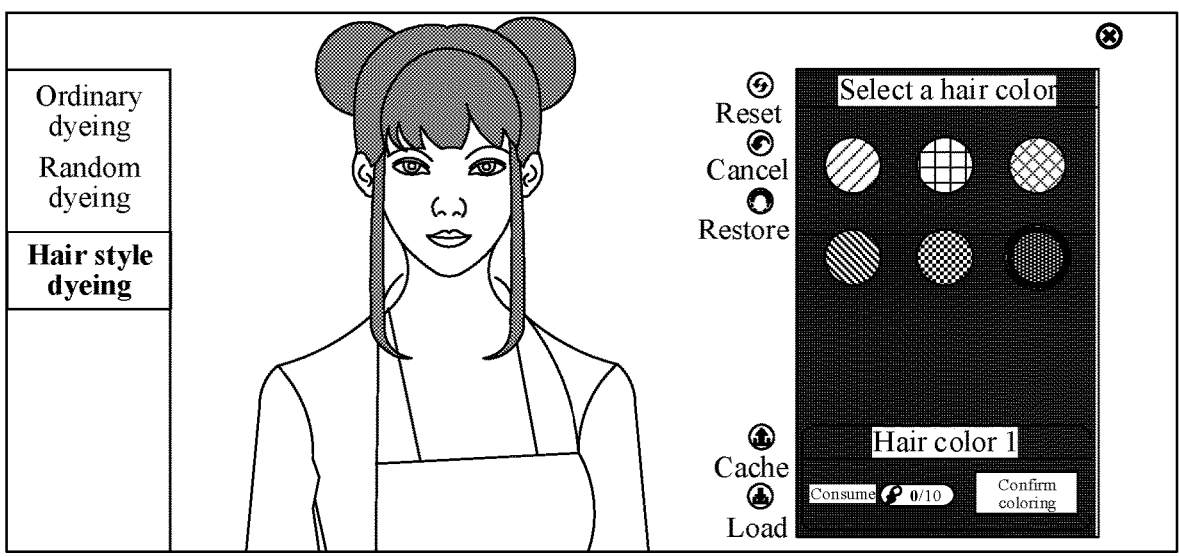
FIG. 6 is a schematic diagram of a hair dyeing interface according to an embodiment.

For example, for each optical path, the computer device calculates a longitudinal angle and an azimuthal angle corresponding to the corresponding optical path after the virtual main light source is incident in the corresponding optical path at a preset incident angle. In response to an input operation by an operator, the computer device obtains inputted illumination information of each optical path. For example, the computer device allows an offset mean and a variance width term to be manually set by the operator, and the operator enters a value of the offset mean in an offset field and increases a value of the variance width term. In response to an input operation by the operator, the computer device obtains illumination information of the pixel in the hair area corresponding to each optical path of the virtual main light source. For example, the computer device obtains at least one saturation corresponding to the virtual image, and determines a saturation from the at least one saturation as the color information of the reflection optical path, that is, the color information of the reflection optical path does not involve brightness information and chroma information, involving saturation information. In this case, half of the saturation may alternatively be used as the color information of the reflection optical path. In response to a setting operation by the operator on the color information in the transmission reflection transmission optical path, inputted color information of the transmission reflection transmission optical path is obtained. The computer device directly uses the color of the hair of the virtual image as the color information of the transmission transmission optical path, or obtains inputted color information of the transmission transmission optical path in response to an operation by the operator on the color information of the transmission transmission optical path. For example, FIG. 6 is a schematic diagram of a hair dyeing interface. There are three selectable dyeing types on the hair dyeing interface, namely, an ordinary dyeing type, a random dyeing type, and a hair style dyeing type. When the operator selects the hair style dyeing type, the operator can select the hair color and determine the dyeing by consuming a preset number of virtual resources (for example, if a hair color 1 is selected, 10 virtual resources need to be consumed). The computer device determines a target hair color in response to a selection operation by the operator and obtains color information corresponding to the target hair color. The dyeing interface is further provided with icons for resetting color information, revoking determined color information, restoring revoked color information, caching color information, and downloading color information.

For acquisition of color information, brightness of the hair is controllable by opening a value range of an offset mean, and moreover, a multi-scattering effect is approximated by increasing a value of a distribution width term (that is, a variance width term). In this way, without expensive multi-scattering rendering, the multi-scattering effect can still be achieved through setting of open color information, ensuring that the hair color is natural and there is no clear dark parts visually. In addition, through the setting of open color information, various new hair colors can be flexibly customized, supporting a variety of stylized effects to meet the artistic requirements of art.

In some embodiments, for each optical path, the computer device calculates a longitudinal angle and an azimuthal angle corresponding to the corresponding optical path after the virtual main light source is incident in the corresponding optical path at a preset incident angle. The computer device determines illumination information according to personal attributes of a virtual image, where the personal attributes include a clothing style and a hairstyle. Alternatively, the computer device determines illumination information according to environmental parameters of a virtual environment, where the environmental parameters include a scene type of the virtual environment and time of the virtual environment. Alternatively, the computer device determines illumination information corresponding to a virtual image in a virtual environment according to a movement trajectory of the virtual image in the virtual environment and an action of the virtual image. The computer device determines color information of a reflection optical path according to half-saturation of a hair color of the virtual image, and obtains inputted color information of a transmission reflection transmission optical path in response to an operation by the operator on the inputted color information of the transmission reflection transmission optical path. The computer device directly uses the color of the hair of the virtual image as the color information of the transmission transmission optical path, or obtains inputted color information of the transmission transmission optical path in response to the operation by the operator on the inputted color information of the transmission transmission optical path.

At step 206, for each optical path, a longitudinal scattering amount can be determined based on the corresponding longitudinal angle and the corresponding illumination information of the pixel. An azimuthal scattering amount can be determined based on the corresponding azimuthal angle. A scattering amount of the pixel corresponding to the optical path can be determined according to the longitudinal scattering amount, the azimuthal scattering amount, and the corresponding color information.

A beam of light hitting hair is scattered to a conical surface centered on an incident point and along an axis of the hair. The scattered light on the conical surface is obtained through propagation on each optical path. For each optical path, a complex spatial relationship can be split into two two-dimensional planes, namely a transverse section and a vertical section of the hair (a normal plane, such as a w-v plane in FIG. 3). The longitudinal scattering amount represents distribution of longitudinal scattering of the pixel on the transverse section, which can be understood as a proportion of light emitted on the transverse section after an emission direction is given. Longitudinal scattering is scattering along a direction of hair growth. The azimuthal scattering amount represents distribution of azimuthal scattering of the pixel on the vertical section, which refers to a proportion of light emitted on the vertical section after an emission direction is given.

In some embodiments, for each optical path, the computer device performs longitudinal scattering calculation according to a longitudinal angle and illumination information corresponding to the optical path, to obtain a longitudinal scattering amount of the corresponding optical path. The computer device performs azimuthal scattering calculation according to an azimuthal angle corresponding to the optical path, to obtain an azimuthal scattering amount of the corresponding optical path. The computer device determines a scattering amount of the pixel corresponding to an optical path according to a longitudinal scattering amount, an azimuthal scattering amount, and corresponding color information.

In some embodiments, illumination information of the reflection optical path includes longitudinal illumination information, and the determining, for each optical path, a longitudinal scattering amount based on the corresponding longitudinal angle and the corresponding illumination information of the pixel, determining an azimuthal scattering amount based on the corresponding azimuthal angle, and determining a scattering amount of the pixel corresponding to the optical path according to the longitudinal scattering amount, the azimuthal scattering amount, and the corresponding color information includes: determining, for the reflection optical path, a longitudinal scattering amount based on the corresponding longitudinal angle of the pixel and the longitudinal illumination information, determining an azimuthal scattering amount based on a cosine value of the corresponding azimuthal angle, and determining a scattering amount of the pixel corresponding to the reflection optical path according to the longitudinal scattering amount, the azimuthal scattering amount, and the corresponding color information.

The longitudinal illumination information of the reflection optical path represents the illumination information in the longitudinal scattering process during propagation through the reflection optical path.

In some embodiments, for the reflection optical path, the computer device obtains the longitudinal scattering amount through Gaussian calculation based on the longitudinal angle and the longitudinal illumination information of the reflection optical path. The computer device determines the cosine value of the corresponding azimuthal angle of the pixel based on the azimuthal angle of the reflection optical path, and determines the azimuthal scattering amount according to the cosine value. The computer device determines the scattering amount of the pixel corresponding to the reflection optical path according to the longitudinal scattering amount, the azimuthal scattering amount, and the corresponding color information.

For example, the longitudinal angle of the reflection optical path includes an incident longitudinal angle and a scattering longitudinal angle. For the reflection optical path, the computer device calculates a half angle of the incident longitudinal angle and the scattering longitudinal angle of the reflection optical path, and obtains the longitudinal scattering amount through Gaussian calculation according to the half angle and the longitudinal illumination information. The computer device determines the cosine value of the corresponding azimuthal angle according to the azimuthal angle of the reflection optical path, and determines the azimuthal scattering amount according to the cosine value. For example, in the process of determining the longitudinal scattering amount, the computer device obtains the incident longitudinal angle $\theta_i$ and the scattering longitudinal angle $\theta_r$ of the reflection optical path, and uses an average of the incident longitudinal angle and the scattering longitudinal angle as the half angle of the reflection optical path. That is, the half angle $\theta_h$ of the reflection optical path is determined by equation (1) as follows:

$$\theta_h = (\theta_i + \theta_r)/2 \qquad \text{Eq. (1)}$$

The computer device obtains an offset mean $\alpha_{R1}$ and a variance width term $\beta_{R1}$ in the reflection optical path, and obtains the longitudinal scattering amount $M_R(\theta_h)$ of the reflection optical path through Gaussian calculation in equation (2) according to the half angle $\partial_h$, the offset mean $\alpha_{R1}$, and the variance width term $\beta_{R1}$ of the reflection optical path, where g( ) is a Gaussian function.

$$M_R(\theta_h) = g(\beta_{R1}; \theta_h - \alpha_{R1}) \qquad \text{Eq. (2)}$$

In this embodiment, for the reflection optical path, the longitudinal scattering amount is determined based on the corresponding longitudinal angle and the longitudinal illumination information, thereby accurately reflecting a proportion of longitudinal scattering light to the incident light after passing through the reflection optical path. The azimuthal scattering amount is determined based on the cosine value of the corresponding azimuthal angle, without the need for additional loop iterations to calculate the azimuthal scattering amount, which simplifies the calculation steps of the azimuthal scattering amount. In this way, according to the longitudinal scattering amount, the azimuthal scattering amount, and the corresponding color information, the scattering amount of the reflection optical path with color expression can be obtained accurately and quickly.

In some embodiments, the longitudinal angle includes an incident longitudinal angle and a scattering longitudinal angle, and the determining a scattering amount of the pixel corresponding to the reflection optical path according to the longitudinal scattering amount, the azimuthal scattering amount, and the corresponding color information includes: calculating a mean deviation between the scattering longitudinal angle and the incident longitudinal angle of the reflection optical path; calculating a product of the longitudinal scattering amount, the azimuthal scattering amount, and the corresponding color information; and calculating the scattering amount of the pixel corresponding to the reflection optical path according to a cosine value of the mean deviation and the product, where the scattering amount of the reflection optical path is proportional to the product, and is inversely proportional to a square of the cosine value of the mean deviation.

In some embodiments, the computer device calculates the mean deviation between the incident longitudinal angle and the scattering longitudinal angle of the reflection optical path, and calculates the product of the longitudinal scattering amount, the azimuthal scattering amount, and the color information of the reflection optical path. The computer device calculates the square of the cosine value of the mean deviation, uses the square of the cosine value of the mean deviation as a denominator, and uses the product as a numerator to obtain the scattering amount of the pixel corresponding to the reflection optical path. For example, the calculating the mean deviation between the incident longitudinal angle of the reflection optical path and the scattering longitudinal angle includes: calculating a difference obtained by subtracting the incident longitudinal angle from the scattering longitudinal angle of the reflection optical path, and determining half of the difference as the mean deviation. Alternatively, a difference obtained by subtracting the scattering longitudinal angle from the incident longitudinal angle of the reflection optical path is calculated, and half of the difference is determined as the mean deviation.

For example, the computer device obtains the incident longitudinal angle $\theta_i$ and the scattering longitudinal angle $\theta_r$ of the reflection optical path, and determines the mean deviation $\theta_d$ of the reflection optical path through equation (3) as follows:

$$\theta_d = (\theta_r - \theta_i)/2 \qquad \text{Eq. (3)}$$

In addition, the scattering amount $S_R$ of the pixel corresponding to the reflection optical path is calculated through equation (4) as follows:

$$S_R = \frac{M_R(\theta_h) \cdot N_R \cdot A_1}{\cos^2 \theta_d} \qquad \text{Eq. (4)}$$

As shown in equation (4), $M_R(\theta_h)$ is the longitudinal scattering amount, $N_R$ is the azimuthal scattering amount, $A_1$ is the color information, $\cos \theta_d$ is the cosine value of the mean deviation, $M_R(\theta_h) \cdot N_R \cdot A_1$ is the product, and $\cos^2 \theta_d$ is the square of the cosine value of the mean deviation. Correction of a solid angle (that is, scattered beam) projection is achieved by dividing the product of the longitudinal scattering amount, the azimuthal scattering amount, and the color information by the square of the cosine value.

In this embodiment, the product of the longitudinal scattering amount, the azimuthal scattering amount, and the corresponding color information is calculated, scattering information with color expression can be quickly and accurately obtained. Through the cosine value of the mean deviation and the product, the proportion of scattered light with color expression to incident light can be directly obtained, that is, the scattering amount of the reflection optical path with rich color expression is obtained, which simplifies the hair coloring step.

In some embodiments, the azimuthal angle includes an incident azimuthal angle and a scattering azimuthal angle, and the determining an azimuthal scattering amount based on a cosine value of the corresponding azimuthal angle includes: calculating a difference between the scattering azimuthal angle and the incident azimuthal angle; and using a cosine value of the difference as the azimuthal scattering amount of the pixel corresponding to the reflection optical path.

In some embodiments, the computer device calculates the difference between the scattering azimuthal angle and the incident azimuthal angle, and determines the cosine value of the difference. The computer device directly uses the cosine value of the difference as the azimuthal scattering amount of the pixel corresponding to the reflection optical path.

For example, the computer device obtains the incident azimuthal angle $\phi_i$ and the scattering azimuthal angle $\phi_r$ of the reflection optical path, and calculates the difference $\phi$ between the scattering azimuthal angle $\phi_r$ and the incident azimuthal angle ($P_i$. The computer device performs cosine function calculation on the difference $\phi$ to obtain the azimuthal scattering amount $N_R$, that is, $N_R = \cos \varphi$. The difference $\phi$ may be obtained by subtracting the scattering azimuthal angle $\varphi_r$ from the incident azimuthal angle $\varphi_i$, or may be obtained by subtracting the incident azimuthal angle $\phi_i$ from the scattering azimuthal angle $\varphi_r$, which is not specifically limited.

In this embodiment, the azimuthal scattering amount is directly determined through the cosine function, which reduces the impact of the azimuthal scattering amount on the scattering amount of the reflection optical path. There is no need for additional loop iterations to calculate the azimuthal scattering amount, which greatly simplifies the calculation steps of the azimuthal scattering amount. Therefore, the cost of subsequent hair rendering of the virtual image is reduced, and popularization on the mobile terminal is achieved.

In some embodiments, the optical paths of the virtual main light source further include a transmission transmission optical path, illumination information of the transmission transmission optical path includes longitudinal illumination information and azimuthal illumination information, and the determining, for each optical path, a longitudinal scattering amount based on the corresponding longitudinal angle and the corresponding illumination information of the pixel, determining an azimuthal scattering amount based on the corresponding azimuthal angle, and determining a scattering amount of the pixel corresponding to the optical path according to the longitudinal scattering amount, the azimuthal scattering amount, and the corresponding color information includes: determining, for the transmission transmission optical path, a longitudinal scattering amount based on the corresponding longitudinal angle of the pixel and the longitudinal illumination information, determining an azimuthal scattering amount based on the corresponding azimuthal angle and the azimuthal illumination information, and determining a scattering amount of the pixel corresponding to the transmission transmission optical path according to the longitudinal scattering amount, the azimuthal scattering amount, and the corresponding color information.

The longitudinal illumination information of the transmission transmission optical path represents illumination information in the longitudinal scattering process during propagation through the transmission transmission optical path, and the azimuthal illumination information of the transmission transmission optical path represents illumination information in the azimuthal scattering process during propagation through the transmission transmission optical path.

In some embodiments, for the transmission transmission optical path, the computer device obtains the longitudinal scattering amount through Gaussian calculation based on the longitudinal angle and the longitudinal illumination information of the transmission transmission optical path, and obtains the azimuthal scattering amount through Gaussian calculation based on the azimuthal angle and the azimuthal illumination information of the transmission transmission optical path. The computer device determines the scattering amount of the pixel corresponding to the transmission transmission optical path according to the longitudinal scattering amount, the azimuthal scattering amount, and the corresponding color information.

For example, the longitudinal angle of the transmission transmission optical path includes an incident longitudinal angle and a scattering longitudinal angle. The azimuthal angle of the transmission transmission optical path includes an incident azimuthal angle and a scattering azimuthal angle. For the transmission transmission optical path, the computer device calculates a half angle of the incident longitudinal angle and the scattering longitudinal angle of the transmission transmission optical path, and obtains the longitudinal scattering amount through Gaussian calculation according to the half angle and the longitudinal illumination information. The computer device calculates a difference between the incident azimuthal angle and the scattering azimuthal angle of the transmission transmission optical path, and obtains the azimuthal scattering amount through Gaussian calculation according to the difference and the azimuthal illumination information. The computer device determines the scattering amount of the pixel corresponding to the transmission transmission optical path according to the longitudinal scattering amount, the azimuthal scattering amount, and the corresponding color information.

As shown in FIG. 5, after the virtual main light source is incident at a specific incident angle, three optical paths are involved, namely, a reflection optical path, a transmission transmission optical path, and a transmission reflection transmission optical path. No matter which optical path is used for propagation, angles of scattered light are the same. It can be seen that incident longitudinal angles of the optical paths are the same and scattering longitudinal angles are the same. Therefore, half angles of the optical paths are the same. Mean deviations between the scattering longitudinal angles and the incident longitudinal angles respectively corresponding to the optical paths are the same. Incident azimuthal angles of the optical paths are the same and scattering azimuthal angles are the same. Therefore, differences between the scattering azimuthal angles and the incident azimuthal angles respectively corresponding to the optical paths are the same.

Figure 7:
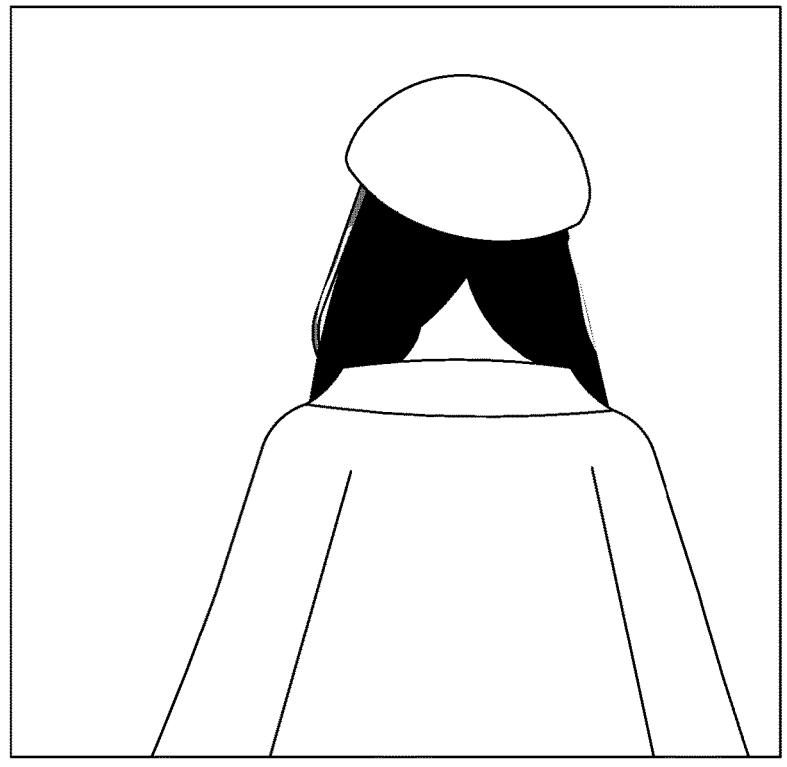
FIG. 7 is a schematic diagram of a hair effect when a virtual image faces away from a virtual main light source according to an embodiment.

For the transmission transmission optical path, when the virtual image faces the virtual main light source, the scattering amount of the transmission transmission optical path is small, that is, the transmission transmission optical path has a small impact on hair coloring. When the virtual image faces away from the virtual main light source, for a pixel at an edge of the hair area, a scattering amount of a transmission transmission optical path of the pixel is large, thereby presenting a light transmission effect at the edge of the hair. FIG. 7 is a schematic diagram of a hair effect when a virtual image faces away from a virtual main light source. It is clear that the hair located at the edge of the hair area in FIG. 7 has a very clear light transmission effect.

For example, in a process of determining a longitudinal scattering amount of a transmission transmission optical path, the computer device obtains an incident longitudinal angle $\theta_i$ and a scattering longitudinal angle $\theta_r$ of the transmission transmission optical path, and determines a half angle $\theta_h$ of the transmission transmission optical path through equation (5) as follows:

$$\theta_h = (\theta_i + \theta_r)/2 \qquad \text{Eq. (5)}$$

The computer device obtains an offset mean $\alpha_{TT1}$ and a variance width term $\beta_{TT1}$ corresponding to longitudinal scattering in the transmission transmission optical path, and obtains the longitudinal scattering amount $M_{TT}(\theta_h)$ of the transmission transmission optical path through Gaussian calculation in equation (6) according to the half angle $\theta_h$, the offset mean $\alpha_{TT1}$, and the variance width term $\beta_{TT1}$ of the transmission transmission optical path, where g( ) is a Gaussian function.

$$M_{TT}(\theta_h) = g(\beta_{TT1}; \theta_h - \alpha_{TT1}) \qquad \text{Eq. (6)}$$

In a process of determining an azimuthal scattering amount of the transmission transmission optical path, the computer device obtains an incident azimuthal angle $\phi_i$ and a scattering azimuthal angle $\phi_r$ of the transmission transmission optical path, and calculates a difference $\phi$ between the scattering azimuthal angle $\phi_i$ and the incident azimuthal angle $\phi_r$. The computer device obtains an offset mean $\alpha_{TT2}$ and a variance width term $\beta_{TT2}$ corresponding to azimuthal scattering in the transmission transmission optical path, and obtains the azimuthal scattering amount $N_{TT}(\phi)$ of the transmission transmission optical path through Gaussian calculation in equation (7) according to the difference $\phi$, the offset mean $\alpha_{TT2}$, and the variance width term $\beta_{TT2}$ of the transmission transmission optical path. The computer device determines the scattering amount of the pixel corresponding to the transmission transmission optical path according to the longitudinal scattering amount, the azimuthal scattering amount, and the corresponding color information.

$$N_{TT}(\phi) = g(\beta_{TT2}; \phi - \alpha_{TT2}) \qquad \text{Eq. (7)}$$

In this embodiment, for the transmission transmission optical path, the longitudinal scattering amount is determined based on the corresponding longitudinal angle and the longitudinal illumination information, thereby accurately reflecting a proportion of longitudinal scattering light to the incident light after passing through the transmission transmission optical path. The azimuthal scattering amount is determined based on the corresponding azimuthal angle and the azimuthal illumination information, without the need for additional loop iterations to calculate the azimuthal scattering amount, which simplifies the calculation steps of the azimuthal scattering amount. In this way, according to the longitudinal scattering amount, the azimuthal scattering amount, and the corresponding color information, the scattering amount of the transmission transmission optical path with color expression can be obtained accurately and quickly.

In some embodiments, the determining a scattering amount of the pixel corresponding to the transmission transmission optical path according to the longitudinal scattering amount, the azimuthal scattering amount, and the corresponding color information includes: obtaining a shadow map corresponding to the hair area, where the shadow map includes a shadow degree of each pixel, and the shadow degree represents whether there is a shadow at the pixel; and determining the scattering amount of the pixel corresponding to the transmission transmission optical path according to a product of a shadow degree of the pixel, the longitudinal scattering amount, the azimuthal scattering amount, and the corresponding color information.

In some embodiments, the computer device obtains the shadow map corresponding to the hair area of the virtual image. For each pixel in the hair area, the computer device determines a scattering amount of the pixel corresponding to the transmission transmission optical path according to a product of a shadow degree of the pixel, the longitudinal scattering amount, the azimuthal scattering amount, and the corresponding color information.

Figure 8:
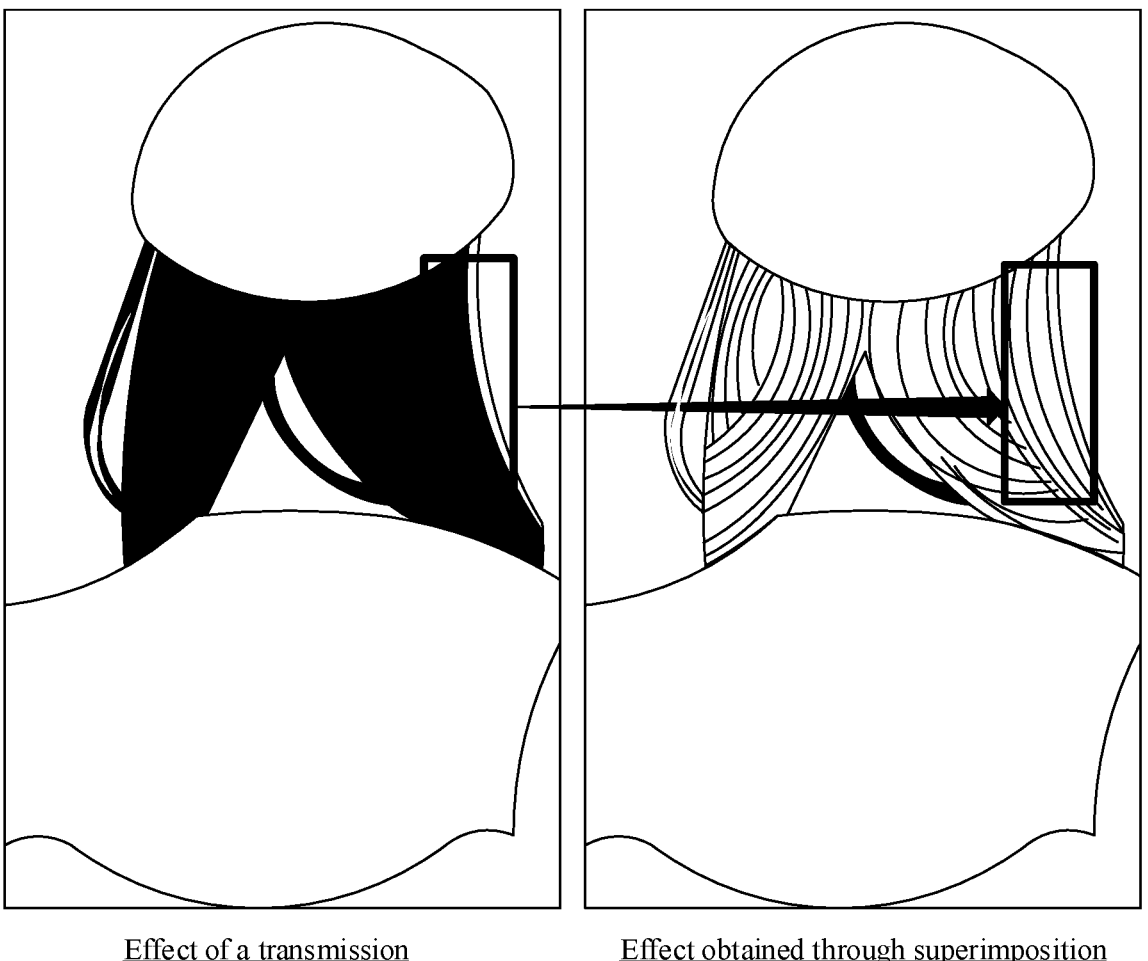
FIG. 8 is a schematic diagram of a transmission effect of hair of a virtual image according to an embodiment.
Figure 9:
FIG. 9 is a schematic diagram of hair rendering effects in different optical paths according to an embodiment.

For a pixel at an edge of the hair area, a shadow degree of the pixel is a positive integer. For a pixel not at the edge of the hair area, a shadow degree of the pixel is regarded as zero, and a scattering amount of the pixel corresponding to the transmission transmission optical path is 0. The shadow map can be used to superimpose the shadow of the virtual image to create an effect of light blocking in thick hair. FIG. 8 is a schematic diagram of a transmission transmission effect of hair of the virtual image. To show the effect of the transmission transmission optical path, when the virtual image is set to face away from the virtual main light source, the computer device determines coloring information by using a scattering amount of the transmission transmission optical path through a debug mode (debugging tool). In some embodiments, a composite effect in the shadow of the hair is increased combining the shadow map. As shown in FIG. 8, there is a very clear transmission transmission effect at the edge of the hair area of the virtual image, but the hair cannot reflect gloss and color. In this case, after the scattering amounts of the three optical paths are superimposed, the effect of superimposing the plurality of optical paths in FIG. 8 is obtained. It can not only reflect the rich gloss and the hair color, but also faithfully reflect the transmission transmission effect when the virtual image faces away from the virtual main light source. The debug mode provides a viewing function for hair color rendering, that is, parameters can be customized, and a rendering effect determined by a scattering amount of at least one optical path corresponding to at least one light source can be viewed. In the foregoing description, the hair rendering effect determined by the transmission transmission optical path can be viewed. In addition, in a schematic diagram of hair rendering effects in different optical paths in FIG. 9, a rendering effect determined by the reflection optical path, a rendering effect determined by the transmission reflection transmission optical path, and a rendering effect obtained through superimposition of a plurality of optical paths can be further viewed. Compared with determining the rendering effect through the reflection optical path and determining the rendering effect through the transmission reflection transmission optical path, the rendering effect obtained through superimposition of a plurality of optical paths can better reflect layers and gloss of the hair, making the rendering more realistic.

In some embodiments, the longitudinal angle of the transmission transmission optical path includes an incident longitudinal angle and a scattering longitudinal angle. After the product of the shadow degree of the pixel, the longitudinal scattering amount, the azimuthal scattering amount, and the corresponding color information is obtained, a mean deviation between the scattering longitudinal angle and the incident longitudinal angle of the transmission transmission optical path is calculated, and a scattering amount of the pixel corresponding to the transmission transmission optical path is calculated according to the product corresponding to the transmission transmission optical path and a square of a cosine value of the mean deviation, where the scattering amount of the transmission transmission optical path is proportional to the product, and is inversely proportional to the square of the cosine value.

For example, as described above, for each pixel, after the shadow degree Y, the longitudinal scattering amount $M_{TT}$ ($\theta_h$), the azimuthal scattering amount $N_{TT}(\phi)$, the color information $A_2$, and the cosine value $\cos\theta_d$ of the mean deviation in the transmission transmission optical path are determined, the scattering amount $S_{TT}$ of the transmission transmission optical path is as follows in equation (8):

$$S_{TT} = \frac{M_{TT}(\theta_h) \cdot N_{TT}(\phi) \cdot A_2 \cdot Y}{\cos^2\theta_d} = \qquad\qquad \text{Eq. (8)}$$

$$\frac{g(\beta_{TT1}; \theta_h - \alpha_{TT1}) \cdot g(\beta_{TT2}; \phi - \alpha_{TT2}) \cdot A_2 \cdot Y}{\cos^2\theta_d}$$

In this embodiment, for the transmission transmission optical path, the shadow map corresponding to the hair area is obtained, which can accurately reflect whether there is a shadow at each pixel. In this way, according to the product of the shadow degree of the pixel, the longitudinal scattering amount, the azimuthal scattering amount, and the corresponding color information, the scattering amount that has color expression and can reflect the shadow effect can be obtained.

In some embodiments, the optical paths of the virtual main light source further include a transmission reflection transmission optical path, illumination information of the transmission reflection transmission optical path includes longitudinal illumination information, and the determining, for each optical path, a longitudinal scattering amount based on the corresponding longitudinal angle and the corresponding illumination information of the pixel, determining an azimuthal scattering amount based on the corresponding azimuthal angle, and determining a scattering amount of the pixel corresponding to the optical path according to the longitudinal scattering amount, the azimuthal scattering amount, and the corresponding color information includes: determining, for the transmission reflection transmission optical path, a longitudinal scattering amount based on the corresponding longitudinal angle of the pixel and the longitudinal illumination information, determining an azimuthal scattering amount based on a cosine value of the corresponding azimuthal angle, and determining a scattering amount of the pixel corresponding to the transmission reflection transmission optical path according to the longitudinal scattering amount, the azimuthal scattering amount, and the corresponding color information.

The longitudinal illumination information of the transmission reflection transmission optical path represents the illumination information in the longitudinal scattering process.

In some embodiments, for the transmission reflection transmission optical path, the computer device obtains the longitudinal scattering amount through Gaussian calculation based on the longitudinal angle and the longitudinal illumination information of the transmission reflection transmission optical path. The computer device determines the cosine value of the corresponding azimuthal angle based on the azimuthal angle of the transmission reflection transmission optical path, and determines the azimuthal scattering amount according to the cosine value. The computer device determines a scattering amount of the pixel corresponding to the transmission reflection transmission optical path according to a longitudinal scattering amount, an azimuthal scattering amount, and corresponding color information.

In some embodiments, the longitudinal angle of the transmission reflection transmission optical path includes an incident longitudinal angle and a scattering longitudinal angle. For the transmission reflection transmission optical path, the computer device calculates a half angle of the incident longitudinal angle and the scattering longitudinal angle of the transmission reflection transmission optical path, and obtains the longitudinal scattering amount through Gaussian calculation according to the half angle and the longitudinal illumination information. The computer device determines the cosine value of the corresponding azimuthal angle according to the azimuthal angle of the transmission reflection transmission optical path, and determines the azimuthal scattering amount according to the cosine value. Further, the azimuthal angle of the transmission reflection transmission optical path includes an incident azimuthal angle and a scattering azimuthal angle. The computer device calculates a difference between the scattering azimuthal angle and the incident azimuthal angle of the transmission reflection transmission optical path; and determines the azimuthal scattering amount of the transmission reflection transmission optical path according to a cosine value of the difference corresponding to the transmission reflection transmission optical path.

For example, after determining the half angle $\theta_h$ of the transmission reflection transmission optical path, the computer device obtains an offset mean $\alpha_{TRT1}$ and a variance width term $\phi_{TRT1}$ in the transmission reflection transmission optical path, and obtains the longitudinal scattering amount $M_{TRT}(\theta_h)$ of the transmission reflection transmission optical path through Gaussian calculation in equation (9) according to the half angle $\theta_h$, the offset mean $\alpha_{TRT1}$, and the variance width term $\beta_{TRT1}$ of the transmission reflection transmission optical path, where g( ) is a Gaussian function.

$$M_{TRT}(\theta_h) = g(\beta_{TRT1}; \theta_h - \alpha_{TRT1}) \qquad \text{Eq. (9)}$$

In this embodiment, for the transmission reflection transmission optical path, the longitudinal scattering amount is determined based on the corresponding longitudinal angle and the longitudinal illumination information, thereby accurately reflecting a proportion of longitudinal scattering light to the incident light after passing through the transmission reflection transmission optical path. The azimuthal scattering amount is determined based on the cosine value of the corresponding azimuthal angle, without the need for additional loop iterations to calculate the azimuthal scattering amount, which simplifies the calculation steps of the azimuthal scattering amount. In this way, according to the longitudinal scattering amount, the azimuthal scattering amount, and the corresponding color information, the scattering amount of the transmission reflection transmission optical path with color expression can be obtained accurately and quickly.

In some embodiments, the longitudinal angle includes an incident longitudinal angle and a scattering longitudinal angle, and the determining a scattering amount of the pixel corresponding to the transmission reflection transmission optical path according to the longitudinal scattering amount, the azimuthal scattering amount, and the corresponding color information includes: calculating a mean deviation between the scattering longitudinal angle and the incident longitudinal angle of the transmission reflection transmission optical path; calculating a product of the longitudinal scattering amount, the azimuthal scattering amount, and the corresponding color information; and calculating the scattering amount of the pixel corresponding to the transmission reflection transmission optical path according to a cosine value of the mean deviation and the product, where the scattering amount of the transmission reflection transmission optical path is proportional to the product, and is inversely proportional to a square of the cosine value of the mean deviation.

In some embodiments, the computer device calculates the mean deviation between the incident longitudinal angle and the scattering longitudinal angle of the transmission reflection transmission optical path, and calculates the product of the longitudinal scattering amount, the azimuthal scattering amount, and the color information of the transmission reflection transmission optical path. The computer device calculates the square of the cosine value of the mean deviation, uses the square of the cosine value of the mean deviation as a denominator, and uses the product as a numerator to obtain the scattering amount of the pixel corresponding to the transmission reflection transmission optical path.

For example, after the mean deviation $\theta_d$ between the scattering longitudinal angle and the incident longitudinal angle of the transmission reflection transmission optical path (that is, the cosine value $\cos \theta_d$ of the mean deviation is obtained), the longitudinal scattering amount $M_{TRT}(\theta_h)$, the azimuthal scattering amount $N_{TRT}$, and the color information $A_3$ are determined, the scattering amount $S_{TRT}$ of the pixel corresponding to the transmission reflection transmission optical path is calculated through equation (10) as follow:

$$S_{TRT} = \frac{M_{TRT}(\theta_h) \cdot N_{TRT} \cdot A_3}{\cos^2 \theta_d} \qquad \text{Eq. (10)}$$

In this embodiment, for the transmission reflection transmission optical path, the product of the longitudinal scattering amount, the azimuthal scattering amount, and the corresponding color information is calculated, scattering information with color expression can be quickly and accurately obtained. Through the cosine value of the mean deviation and the product, the proportion of scattered light with color expression to incident light can be directly obtained, that is, the scattering amount of the transmission reflection transmission optical path with rich color expression is obtained, which simplifies the hair coloring step.

At step 208, scattering amounts of the pixel corresponding to the optical paths can be fused to obtain coloring information of the pixel corresponding to the virtual main light source, the coloring information being configured for rendering hair of the virtual image.

The coloring information can be understood as the scattering amount of the pixel, which may be a scattering amount of one optical path, or a scattering amount obtained by fusing scattering amounts of a plurality of optical paths.

In some embodiments, the computer device fuses the scattering amounts of the same pixel corresponding to the reflection optical path, the transmission transmission optical path, and the transmission reflection transmission optical path to obtain the coloring information of the pixel corresponding to the virtual main light source, the coloring information being configured for rendering the hair of the virtual image.

For example, for each pixel, the computer device superimposes a scattering amount of the reflection optical path, a scattering amount of the transmission transmission optical path, and a scattering amount of the transmission reflection transmission optical path of the pixel to obtain a total scattering amount, and determines the total scattering amount as coloring information of the pixel corresponding to the virtual main light source.

For another example, for each pixel, the computer device determines a weight of each optical path, weights, according to the weight of each optical path, a scattering amount of the reflection optical path, a scattering amount of the transmission transmission optical path, and a scattering amount of the transmission reflection transmission optical path of the pixel to obtain a total scattering amount, and determines the total scattering amount as coloring information of the pixel corresponding to the virtual main light source.

In the foregoing hair rendering method, the main light source information of the virtual main light source disposed in the virtual environment is obtained, where the main light source information includes a light source position and a light source direction that change with time, and the virtual main light source acts on the hair area of the virtual image. The optical paths of the virtual main light source include a reflection optical path, a transmission transmission optical path, and a transmission reflection transmission optical path. A longitudinal angle, an azimuthal angle, illumination information, and color information that are of the pixel in the hair area corresponding to each optical path of the virtual main light source are obtained. For each optical path, a longitudinal scattering amount is determined based on the corresponding longitudinal angle and the corresponding illumination information, which can accurately predict the scattering situation of the pixel in the longitudinal scattering process. The azimuthal scattering amount can be directly determined based on the corresponding azimuthal angle, thereby accurately predicting the scattering situation of the pixel in the azimuthal scattering process. A scattering amount of the pixel corresponding to an optical path is determined according to a longitudinal scattering amount, an azimuthal scattering amount, and corresponding color information. In this way, based on longitudinal scattering, azimuthal scattering, and color information, gloss of the pixel in each optical path can be authentically simulated. Finally, scattering amounts of the pixel corresponding to the optical paths are fused to obtain coloring information of the pixel corresponding to the virtual main light source, realizing realistic and efficient rendering of the hair of the virtual character, and improving the hair rendering effect.

In some embodiments, the method further includes: obtaining backlight source information of a virtual backlight source disposed in the virtual environment, where the backlight source information includes a light source position and an illumination direction that change with time, the virtual backlight source acts on the hair area of the virtual image, and a horizontal projection direction of the illumination direction of the virtual backlight source is opposite to a horizontal projection direction of an illumination direction of the virtual main light source; obtaining a longitudinal angle, illumination information, and color information that are of a pixel in the hair area corresponding to each optical path of the virtual backlight source, where optical paths of the virtual backlight source include a reflection optical path and a transmission reflection transmission optical path; determining, for each optical path corresponding to the virtual backlight source, a longitudinal scattering amount corresponding to the virtual backlight source based on the corresponding longitudinal angle and the corresponding illumination information of the pixel, and determine a scattering amount of the pixel corresponding to the optical path according to the longitudinal scattering amount corresponding to the virtual backlight source and the corresponding color information; and fusing scattering amounts of the pixel corresponding to the optical paths to obtain coloring information of the pixel corresponding to the virtual backlight source, the coloring information being configured for rendering hair of the virtual image.

The virtual backlight source is a light source disposed on the back of the virtual image, and is used to fill in the light on the back of the virtual image. Similarly, as time changes, a position and a light source direction of the virtual backlight source in the virtual environment also change. Therefore, the virtual backlight source is simulated in the virtual environment through the backlight source information. Certainly, in some other embodiments, the virtual backlight source may not change with time, that is, the position and the light source direction of the virtual backlight source in the virtual environment are the same no matter how time changes.

In some embodiments, the computer device determines the illumination direction of the virtual backlight source according to the illumination direction of the virtual main light source, and the illumination direction of the virtual backlight source is opposite to the illumination direction of the virtual main light source. The computer device determines the back of the virtual image as the light source position of the virtual backlight source, and simulates the virtual backlight source acting on the hair area of the virtual image in the simulation environment (or virtual environment) according to the light source position and the illumination direction of the virtual backlight source, or the computer device uses the camera light source as the virtual backlight source. For each optical path corresponding to the virtual backlight source, a longitudinal scattering amount corresponding to the virtual backlight source is determined based on the corresponding longitudinal angle and the corresponding illumination information. The computer device determines the scattering amount of the pixel corresponding to the optical path according to the product of the longitudinal scattering amount and the corresponding color information. The scattering amounts of the same pixel corresponding to the optical paths are superimposed, to obtain the coloring information of the pixel corresponding to the virtual backlight source.

Alternatively, the computer device determines the azimuthal scattering amount based on the corresponding azimuthal angle, and determines the scattering amount of the pixel corresponding to the optical path according to the product of the longitudinal scattering amount, the azimuthal scattering amount, and the corresponding color information. The scattering amounts of the pixel corresponding to the optical paths are superimposed, to obtain the coloring information of the pixel corresponding to the virtual backlight source.

In some embodiments, illumination information of the reflection optical path corresponding to the virtual backlight source includes longitudinal illumination information, and the determining, for each optical path corresponding to the virtual backlight source, a longitudinal scattering amount corresponding to the virtual backlight source based on the corresponding longitudinal angle and the corresponding illumination information of the pixel, and determining a scattering amount of the pixel corresponding to the optical path according to the longitudinal scattering amount corresponding to the virtual backlight source and the corresponding color information includes: obtaining, for the reflection optical path of the virtual backlight source, the longitudinal scattering amount corresponding to the virtual backlight source according to the corresponding longitudinal angle of the pixel and the longitudinal illumination information through Gaussian calculation; and determining the scattering amount of the pixel corresponding to the reflection optical path according to a product of the longitudinal scattering amount corresponding to the virtual backlight source and the corresponding color information.

For example, for the reflection optical path of the virtual backlight source, the corresponding incident longitudinal angle $\theta_i'$ and the corresponding scattering longitudinal angle $\theta_r'$ are obtained, and an average of the incident longitudinal angle and the scattering longitudinal angle is used as the half angle of the reflection optical path. That is, the half angle $\theta_h'$ of the reflection optical path is determined by equation (11) as follows:

$$\theta_h' = (\theta_i' + \theta_r')/2 \qquad \text{Eq. (11)}$$

The computer device obtains an offset mean $\alpha_{R1}'$ and a variance width term $\beta_{R1}'$ in the reflection optical path, and obtains the longitudinal scattering amount $M_R'(\theta_h')$ of the reflection optical path through Gaussian calculation in equation (12) according to the half angle $\theta_h'$, the offset mean $\alpha_{R1}'$, and the variance width term $\beta_{R1}'$ of the reflection optical path, where g( ) is a Gaussian function.

$$M_R'(\theta_h') = g(\beta_{R1}'; \theta_h' - \alpha_{R1}') \qquad \text{Eq. (12)}$$

In this embodiment, for the reflection optical path of the virtual backlight source, the longitudinal scattering amount is determined based on the corresponding longitudinal angle and the longitudinal illumination information, thereby accurately reflecting a proportion of longitudinal scattering light to the incident light after passing through the reflection optical path. The azimuthal scattering amount is determined based on the cosine value of the corresponding azimuthal angle, without the need for additional loop iterations to calculate the azimuthal scattering amount, which simplifies the calculation steps of the azimuthal scattering amount. In this way, according to the longitudinal scattering amount, the azimuthal scattering amount, and the corresponding color information, the scattering amount of the reflection optical path with color expression can be obtained accurately and quickly.

In some embodiments, the longitudinal angle includes an incident longitudinal angle and a scattering longitudinal angle, and the determining the scattering amount of the pixel corresponding to the reflection optical path according to a product of the longitudinal scattering amount corresponding to the virtual backlight source and the corresponding color information includes: calculating a mean deviation between the scattering longitudinal angle and the incident longitudinal angle of the reflection optical path of the virtual backlight source; and determining the scattering amount of the pixel corresponding to the reflection optical path according to a cosine value of the mean deviation and the product, where the scattering amount of the reflection optical path is proportional to the product, and is inversely proportional to a square of the cosine value of the mean deviation.

In some embodiments, for the reflection optical path corresponding to the virtual backlight source, the illumination information of the reflection optical path includes longitudinal illumination information, and the longitudinal angle includes an incident longitudinal angle and a scattering longitudinal angle. After the product of the longitudinal scattering amount and the corresponding color information is determined, for the reflection optical path, a mean deviation between the scattering longitudinal angle and the incident longitudinal angle of the reflection optical path is calculated; and the scattering amount of the pixel corresponding to the reflection optical path is calculated according to a cosine value of the mean deviation and the product, where the scattering amount of the reflection optical path is proportional to the product, and is inversely proportional to a square of the cosine value of the mean deviation.

Alternatively, after the product of the longitudinal scattering amount, the azimuthal scattering amount, and the corresponding color information is determined, for the reflection optical path, a mean deviation between the scattering longitudinal angle and the incident longitudinal angle of the reflection optical path is calculated; and the scattering amount of the pixel corresponding to the reflection optical path is calculated according to a cosine value of the mean deviation and the product, where the scattering amount of the reflection optical path is proportional to the product, and is inversely proportional to a square of the cosine value of the mean deviation. For the reflection optical path corresponding to the virtual backlight source, the step of determining the azimuthal scattering amount of the reflection optical path includes: determining the azimuthal scattering amount according to the azimuthal angle corresponding to the reflection optical path.

For example, the computer device obtains the incident longitudinal angle $\theta_i'$ and the scattering longitudinal angle $\theta_r'$ of the reflection optical path of the virtual backlight source, and determines the mean deviation $\theta_d'$ of the reflection optical path through equation (13):

$$\theta_d' = (\theta_r' - \theta_i')/2 \qquad \text{Eq. (13)}$$

In this case, the scattering amount $S_R'$ of the reflection optical path of the virtual backlight source is as follows in equation (14):

$$S_R' = \frac{M_R'(\theta_h') \cdot A_1'}{(\cos\theta_d')^2} \qquad \text{Eq. (14)}$$

In the foregoing example, $N_R'$ is obtained without calculating the azimuthal scattering amount. $A_1'$ is the color information corresponding to the reflection optical path of the virtual backlight source.

In this embodiment, the product of the longitudinal scattering amount and the corresponding color information is calculated, scattering information with color expression can be quickly and accurately obtained. Through the cosine value of the mean deviation and the product, the proportion of scattered light with color expression to incident light can be directly obtained, that is, the scattering amount of the reflection optical path with rich color expression is obtained, which simplifies the hair coloring step.

In some embodiments, the optical paths of the virtual backlight source further include a transmission reflection transmission optical path, illumination information of the transmission reflection transmission optical path includes longitudinal illumination information, and the determining, for each optical path corresponding to the virtual backlight source, a longitudinal scattering amount corresponding to the virtual backlight source based on the corresponding longitudinal angle and the corresponding illumination information of the pixel, and determining a scattering amount of the pixel corresponding to the optical path according to the longitudinal scattering amount corresponding to the virtual backlight source and the corresponding color information includes: obtaining, for the transmission reflection transmission optical path of the virtual backlight source, the longitudinal scattering amount corresponding to the virtual backlight source according to the corresponding longitudinal angle of the pixel and the longitudinal illumination information through Gaussian calculation; and determining the scattering amount of the pixel corresponding to the transmission reflection transmission optical path according to a product of the longitudinal scattering amount and the corresponding color information.

In some embodiments, for the transmission reflection transmission optical path corresponding to the virtual backlight source, the illumination information of the transmission reflection transmission optical path includes longitudinal illumination information, and the longitudinal angle includes an incident longitudinal angle and a scattering longitudinal angle. After the product of the longitudinal scattering amount and the corresponding color information is determined, for the transmission reflection transmission optical path, a mean deviation between the scattering longitudinal angle and the incident longitudinal angle of the transmission reflection transmission optical path is calculated; and the scattering amount of the pixel corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation.

Alternatively, after the product of the longitudinal scattering amount, the azimuthal scattering amount, and the corresponding color information is determined, for the transmission reflection transmission optical path, a mean deviation between the scattering longitudinal angle and the incident longitudinal angle of the transmission reflection transmission optical path is calculated; and the scattering amount of the pixel corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation.

Further, for the transmission reflection transmission optical path corresponding to the virtual backlight source, the step of determining the longitudinal scattering amount of the transmission reflection transmission optical path includes: obtaining the longitudinal scattering amount through Gaussian calculation according to the longitudinal angle and the longitudinal illumination information of the transmission reflection transmission optical path.

For the transmission reflection transmission optical path corresponding to the virtual backlight source, the step of determining the azimuthal scattering amount of the transmission reflection transmission optical path includes: determining the azimuthal scattering amount according to the azimuthal angle corresponding to the transmission reflection transmission optical path.

For example, after the half angle $\theta_h'$ of the transmission reflection transmission optical path, an offset mean $\alpha_{TRT1}'$, and a variance width term $\beta_{TRT1}'$ are determined, the longitudinal scattering amount $M_{TRT}(\theta_h')=g(\beta_{TRT1}'; \theta_h'-\alpha_{TRT1}')$ of the transmission reflection transmission optical path is obtained through Gaussian calculation in equation (15) according to the half angle $\theta_h'$, the offset mean $\alpha_{TRT1}'$), and the variance width term $\beta_{TRT1}'$, where g( ) is a Gaussian function. In addition, the corresponding color information $A_3'$ is obtained, and the scattering amount $S_{TRT}'$ of the pixel corresponding to the transmission reflection transmission optical path is calculated through equation (16):

$$M_{TRT}(\theta_h') = g(\beta_{TRT1}'; \theta_h' - \alpha_{TRT1}') \qquad \text{Eq. (15)}$$

$$S_{TRT}' = \frac{M_{TRT}(\theta_h') \cdot A_3'}{(\cos\theta_d')^2} \qquad \text{Eq. (16)}$$

The calculation of the foregoing half angle $\theta_h'$ can be defined as follows in equation (17):

$$\theta_h' = (\theta_i' + \theta_r')/2 \qquad \text{Eq. (17)}$$

The transmission transmission optical path can clearly reflect the outline effect of the front face of the virtual image. However, in the process of determining the coloring information of the virtual backlight source, the virtual backlight source fills in the light on the back of the virtual image. Therefore, there is no need to calculate the transmission transmission optical path. Further, in the backlight filling process of the virtual backlight source, the azimuthal scattering amounts corresponding to the optical paths are very weak and can be ignored. In this case, the coloring information of the pixel corresponding to the virtual backlight source can be determined directly according to the product of the longitudinal scattering amount and the corresponding color information, which greatly optimizes the processing steps of the virtual backlight source.

In this embodiment, for the transmission reflection transmission optical path of the virtual backlight source, the product of the longitudinal scattering amount and the corresponding color information is calculated, scattering information with color expression can be quickly and accurately obtained. Through the cosine value of the mean deviation and the product, the proportion of scattered light with color expression to incident light can be directly obtained, that is, the scattering amount of the transmission reflection transmission optical path with rich color expression is obtained, which simplifies the hair coloring step.

In this embodiment, the virtual backlight source acting on the hair area of the virtual image is determined, to fill in the light on the back of the virtual image. For each optical path corresponding to the virtual backlight source, the longitudinal scattering amount is determined based on the corresponding longitudinal angle and the corresponding illumination information, and according to the longitudinal scattering amount and the corresponding color information, the scattering amount of the virtual backlight source in each optical path is obtained. The scattering amounts of the pixel corresponding to the optical paths are fused to further enhance the gloss effect of the pixels in the hair area, thereby obtaining the coloring information that simulates real hair under backlight, which is conducive to subsequent realistic and efficient rendering of the hair of the virtual character, to improve the hair rendering effect.

In some embodiments, the method further includes: obtaining light source information of a camera light source disposed in the virtual environment, where the light source information includes a light source position and a light source direction that change with time, and the camera light source acts on the hair area of the virtual image; obtaining a longitudinal angle, illumination information, and color information that are of a pixel in the hair area corresponding to each optical path of the camera light source, where optical paths of the camera light source include a reflection optical path and a transmission reflection transmission optical path; determining, for each optical path corresponding to the camera light source, a longitudinal scattering amount corresponding to the camera light source based on the corresponding longitudinal angle and the corresponding illumination information of the pixel, and determining a scattering amount of the pixel corresponding to the optical path according to the longitudinal scattering amount corresponding to the camera light source and the corresponding color information; and fusing scattering amounts of the pixel corresponding to the optical paths to obtain coloring information of the pixel corresponding to the camera light source, the coloring information being configured for rendering hair of the virtual image.

The camera light source is a point light source emitted from a camera position, which can be understood as a point light source emitted by user eyes and used to supplement various anisotropic highlights. Similarly, as time changes, a position and a light source direction of the camera light source in the virtual environment also change. Therefore, the camera light source is simulated in the virtual environment through the light source information. Certainly, in some other embodiments, the camera light source may not change with time, that is, the position and the light source direction of the camera light source in the virtual environment are the same no matter how time changes.

In some embodiments, the computer device simulates the camera light source acting on the hair area of the virtual image in the virtual environment according to the light source information of the camera light source. For each optical path corresponding to the camera light source, the computer device determines a longitudinal scattering amount corresponding to the camera light source based on the corresponding longitudinal angle and the corresponding illumination information, and determines a scattering amount of the pixel corresponding to the optical path according to the product of the longitudinal scattering amount corresponding to the camera light source and the corresponding color information. The computer device superimposes the scattering amounts of the same pixel corresponding to the optical paths to obtain the coloring information of the pixel corresponding to the camera light source.

Alternatively, the computer device determines the azimuthal scattering amount based on the corresponding azimuthal angle, and determines the scattering amount of the pixel corresponding to the optical path according to the product of the longitudinal scattering amount, the azimuthal scattering amount, and the corresponding color information. The scattering amounts of the pixel corresponding to the optical paths are superimposed, to obtain the coloring information of the pixel corresponding to the camera light source.

In some embodiments, illumination information of the reflection optical path corresponding to the camera light source includes longitudinal illumination information, and the determining, for each optical path corresponding to the camera light source, a longitudinal scattering amount corresponding to the camera light source based on the corresponding longitudinal angle and the corresponding illumination information of the pixel, and determining a scattering amount of the pixel corresponding to the optical path according to the longitudinal scattering amount corresponding to the camera light source and the corresponding color information includes: obtaining, for the reflection optical path of the camera light source, the longitudinal scattering amount corresponding to the camera light source according to the corresponding longitudinal angle of the pixel and the longitudinal illumination information through Gaussian calculation; and determining the scattering amount of the pixel corresponding to the reflection optical path according to a product of the longitudinal scattering amount corresponding to the camera light source and the corresponding color information.

In some embodiments, for the reflection optical path corresponding to the camera light source, the illumination information of the reflection optical path includes longitudinal illumination information, and the longitudinal angle includes an incident longitudinal angle and a scattering longitudinal angle. After the product of the longitudinal scattering amount and the corresponding color information is determined, for the reflection optical path, a mean deviation between the scattering longitudinal angle and the incident longitudinal angle of the reflection optical path is calculated; and the scattering amount of the pixel corresponding to the reflection optical path is calculated according to a cosine value of the mean deviation and the product, where the scattering amount of the reflection optical path is proportional to the product, and is inversely proportional to a square of the cosine value of the mean deviation.

Alternatively, after the product of the longitudinal scattering amount, the azimuthal scattering amount, and the corresponding color information is determined, for the reflection optical path, a mean deviation between the scattering longitudinal angle and the incident longitudinal angle of the reflection optical path is calculated; and the scattering amount of the pixel corresponding to the reflection optical path is calculated according to a cosine value of the mean deviation and the product, where the scattering amount of the reflection optical path is proportional to the product, and is inversely proportional to a square of the cosine value of the mean deviation.

Further, for the reflection optical path corresponding to the camera light source, the step of determining the longitudinal scattering amount of the reflection optical path includes: obtaining the longitudinal scattering amount through Gaussian calculation according to the longitudinal angle and the longitudinal illumination information of the reflection optical path.

For the reflection optical path corresponding to the camera light source, the step of determining the azimuthal scattering amount of the reflection optical path includes: determining the azimuthal scattering amount according to the azimuthal angle corresponding to the reflection optical path.

In some embodiments, for the transmission reflection transmission optical path corresponding to the camera light source, the illumination information of the transmission reflection transmission optical path includes longitudinal illumination information, and the longitudinal angle includes an incident longitudinal angle and a scattering longitudinal angle. After the product of the longitudinal scattering amount and the corresponding color information is determined, for the transmission reflection transmission optical path, a mean deviation between the scattering longitudinal angle and the incident longitudinal angle of the transmission reflection transmission optical path is calculated; and the scattering amount of the pixel corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation.

Alternatively, after the product of the longitudinal scattering amount, the azimuthal scattering amount, and the corresponding color information is determined, for the transmission reflection transmission optical path, a mean deviation between the scattering longitudinal angle and the incident longitudinal angle of the transmission reflection transmission optical path is calculated; and the scattering amount of the pixel corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation.

For example, the computer device obtains the incident longitudinal angle $\theta_i''$ and the scattering longitudinal angle $\theta_r''$ of the reflection optical path of the camera light source, and determines the mean deviation $\theta_d''$ of the reflection optical path through equation (18):

$$\theta_d'' = (\theta_r'' - \theta_i'')/2 \qquad \text{Eq. (18)}$$

In this case, the scattering amount $S_R''$ of the reflection optical path of the camera light source is as follows in equation (19):

$$S_R'' = \frac{M_R''(\theta_h'') \cdot A_1''}{(\cos\theta_d'')^2} \qquad \text{Eq. (19)}$$

In the foregoing example, $N_R''$ is obtained without calculating the azimuthal scattering amount. $A_1''$ is the color information corresponding to the reflection optical path of the camera light source.

In this embodiment, the product of the longitudinal scattering amount and the corresponding color information is calculated, scattering information with color expression can be quickly and accurately obtained. Through the cosine value of the mean deviation and the product, the proportion of scattered light with color expression to incident light can be directly obtained, that is, the scattering amount of the reflection optical path with rich color expression is obtained, which simplifies the hair coloring step.

In some embodiments, the optical paths of the camera light source include a transmission reflection transmission optical path, illumination information of the transmission reflection transmission optical path includes longitudinal illumination information, and the determining, for each optical path corresponding to the camera light source, a longitudinal scattering amount corresponding to the camera light source based on the corresponding longitudinal angle and the corresponding illumination information of the pixel, and determining a scattering amount of the pixel corresponding to the optical path according to the longitudinal scattering amount corresponding to the camera light source and the corresponding color information includes: obtaining, for the transmission reflection transmission optical path of the camera light source, the longitudinal scattering amount corresponding to the camera light source according to the corresponding longitudinal angle of the pixel and the longitudinal illumination information through Gaussian calculation; and determining the scattering amount of the pixel corresponding to the transmission reflection transmission optical path according to the longitudinal scattering amount corresponding to the camera light source and the corresponding color information.

In some embodiments, for the transmission reflection transmission optical path corresponding to the camera light source, the illumination information of the transmission reflection transmission optical path includes longitudinal illumination information, and the longitudinal angle includes an incident longitudinal angle and a scattering longitudinal angle. After the product of the longitudinal scattering amount and the corresponding color information is determined, for the transmission reflection transmission optical path, a mean deviation between the scattering longitudinal angle and the incident longitudinal angle of the transmission reflection transmission optical path is calculated; and the scattering amount of the camera light source corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation.

Alternatively, after the product of the longitudinal scattering amount, the azimuthal scattering amount, and the corresponding color information is determined, for the transmission reflection transmission optical path, a mean deviation between the scattering longitudinal angle and the incident longitudinal angle of the transmission reflection transmission optical path is calculated; and the scattering amount of the camera light source corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation. For the transmission reflection transmission optical path corresponding to the camera light source, the step of determining the azimuthal scattering amount of the transmission reflection transmission optical path includes: determining the azimuthal scattering amount according to the azimuthal angle corresponding to the transmission reflection transmission optical path.

For example, after the half angle $\theta_h''$ of the camera light source corresponding to the transmission reflection transmission optical path, an offset mean $\alpha_{TRT1}''$, and a variance width term $\beta_{TRT1}''$ are determined, the longitudinal scattering amount $M_{TRT}(\theta_h'')=g(\beta_{TRT1}''; \theta_h''-\alpha_{TRT1}'')$ of the transmission reflection transmission optical path is obtained through Gaussian calculation in equation (20) according to the half angle $\theta_h''$, the offset mean $\alpha_{TRT1}''$, and the variance width term $\beta_{TRT1}''$, where g( ) is a Gaussian function. In addition, the corresponding color information $A_3''$ is obtained, and the scattering amount $S_{TRT}''$ of the pixel corresponding to the transmission reflection transmission optical path is calculated through equation (21):

$$M_{TRT}(\theta_h'') = g(\beta_{TRT1}''; \theta_h'' - \alpha_{TRT1}'') \qquad \text{Eq. (20)}$$

-continued $$S_{TRT}'' = \frac{M_{TRT}(\theta_h'') \cdot A_3''}{(\cos\theta_d'')^2}$$ 
　Eq. (21)

The calculation of the foregoing half angle $\theta_h''$ can be defined in equation (22) as follows:

$$\theta_h'' = (\theta_i'' + \theta_r'')/2$$
　Eq. (22)

In this embodiment, for the transmission reflection transmission optical path of the camera light source, the product of the longitudinal scattering amount and the corresponding color information is calculated, scattering information with color expression can be quickly and accurately obtained. Through the cosine value of the mean deviation and the product, the proportion of scattered light with color expression to incident light can be directly obtained, that is, the scattering amount of the transmission reflection transmission optical path with rich color expression is obtained, which simplifies the hair coloring step.

In this embodiment, the camera light source acting on the hair area of the virtual image is determined, to supplement anisotropic highlights to the hair area of the virtual image. For each optical path corresponding to the camera light source, the longitudinal scattering amount is determined based on the corresponding longitudinal angle and the corresponding illumination information, and according to the longitudinal scattering amount and the corresponding color information, the scattering amount of the camera light source in each optical path is obtained. The scattering amounts of the pixel corresponding to the optical paths are fused to further enhance the gloss effect of the pixels in the hair area, thereby obtaining the coloring information that simulates real hair in the camera light source, which is conducive to subsequent realistic and efficient rendering of the hair of the virtual character, to improve the hair rendering effect.

In some embodiments, virtual optical sources action on a same pixel further include a virtual backlight source and a camera light source. The method further includes: fusing the coloring information of the virtual main light source, the coloring information of the virtual backlight source, and the coloring information of the camera light source corresponding to the same pixel, to obtain target coloring information of the pixel, where the target coloring information is configured for rendering the hair of the virtual image.

In some embodiments, after determining the coloring information respectively corresponding to each light source, the computer device fuses the coloring information of the virtual main light source, the coloring information of the virtual backlight source, and the coloring information of the camera light source corresponding to the same pixel, to obtain target coloring information of the pixel, where the target coloring information is configured for rendering the hair of the virtual image.

Figure 10:
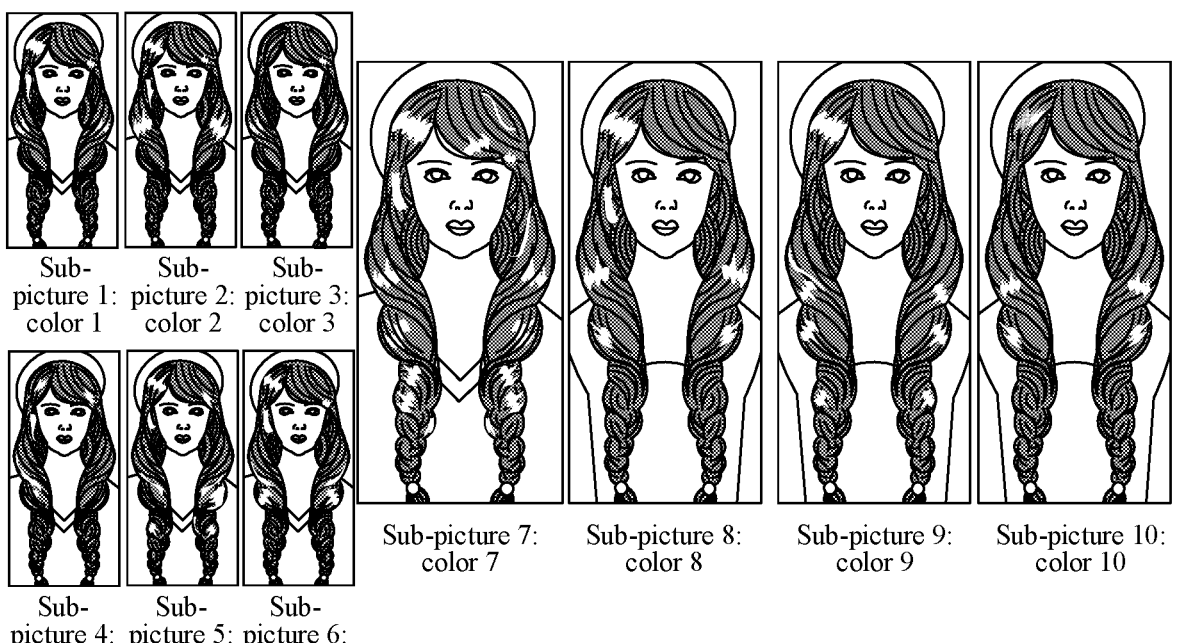
FIG. 10 is a schematic diagram of various gloss effects of various hair colors according to an embodiment.

In some embodiments, the computer device determines a coloring weight corresponding to each light source. For each pixel in the hair area, the computer device performs weighted calculation according to the coloring weight corresponding to each light source and the coloring information of the pixel corresponding to each light source, to determine the target coloring information of the pixel. The coloring weights of the light sources may be the same or different. This is not specifically limited. For example, FIG. 10 is a schematic diagram of various gloss effects of various hair colors. FIG. 10 provides 10 sub-pictures. For each sub-picture, target coloring information is obtained through customized color information and illumination information in different optical paths, and then a sub-picture is generated through rendering according to each piece of target coloring information. By setting the color information corresponding to each optical path in the three light sources, rich color support can be obtained, that is, a sub-picture 1 corresponds to a color 1, . . . , and a sub-picture 10 corresponds to a color 10. Through the setting of open illumination information, a rich gloss effect can be obtained. That is, the sub-picture displays highlights of different sizes and distributions, thereby obtaining rendered hair with a good rendering effect and high rendering efficiency.

As described in the background art, the hair effect obtained through rendering according to the Kajiya-kay illumination model is shown in FIG. 11, which is a schematic diagram of a comparison between a rendering effect of a Kajiya-kay illumination model and real hair. In an aspect, the hair rendered through the Kajiya-kay illumination model is stiff, shiny, and cannot fit the illumination distribution of the hair. The rendering effect obtained by using the method of the disclosure is shown in FIG. 12, which is a schematic diagram of a rendering effect of the disclosure. The rendered hair of the virtual image determined according to the target coloring information in the disclosure has rich gloss and a real hair effect, that is, the rendered hair is of high quality.

Figure 13:
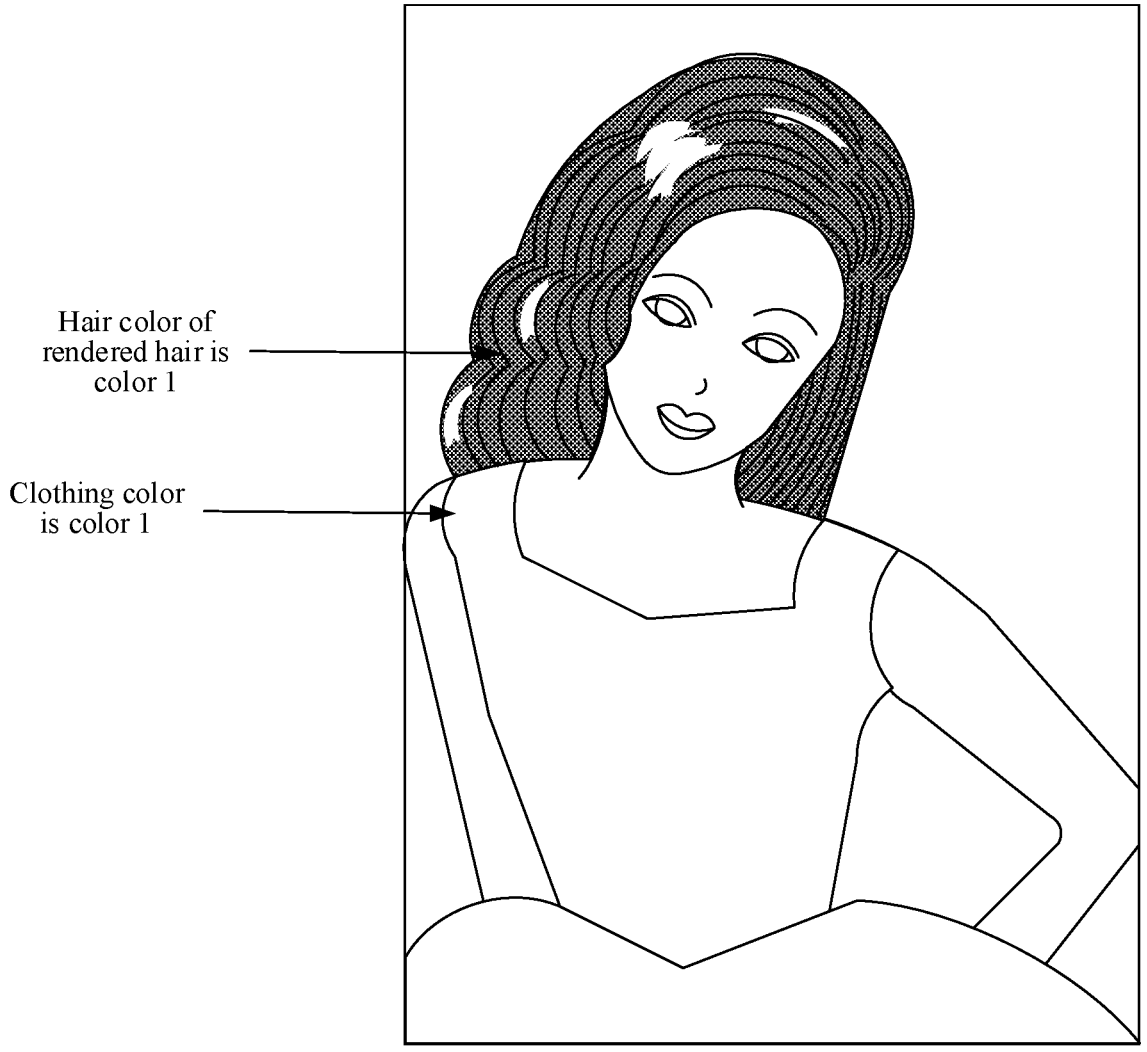
FIG. 13 is a schematic diagram of a secondary design of a virtual image according to an embodiment.
Figure 14:
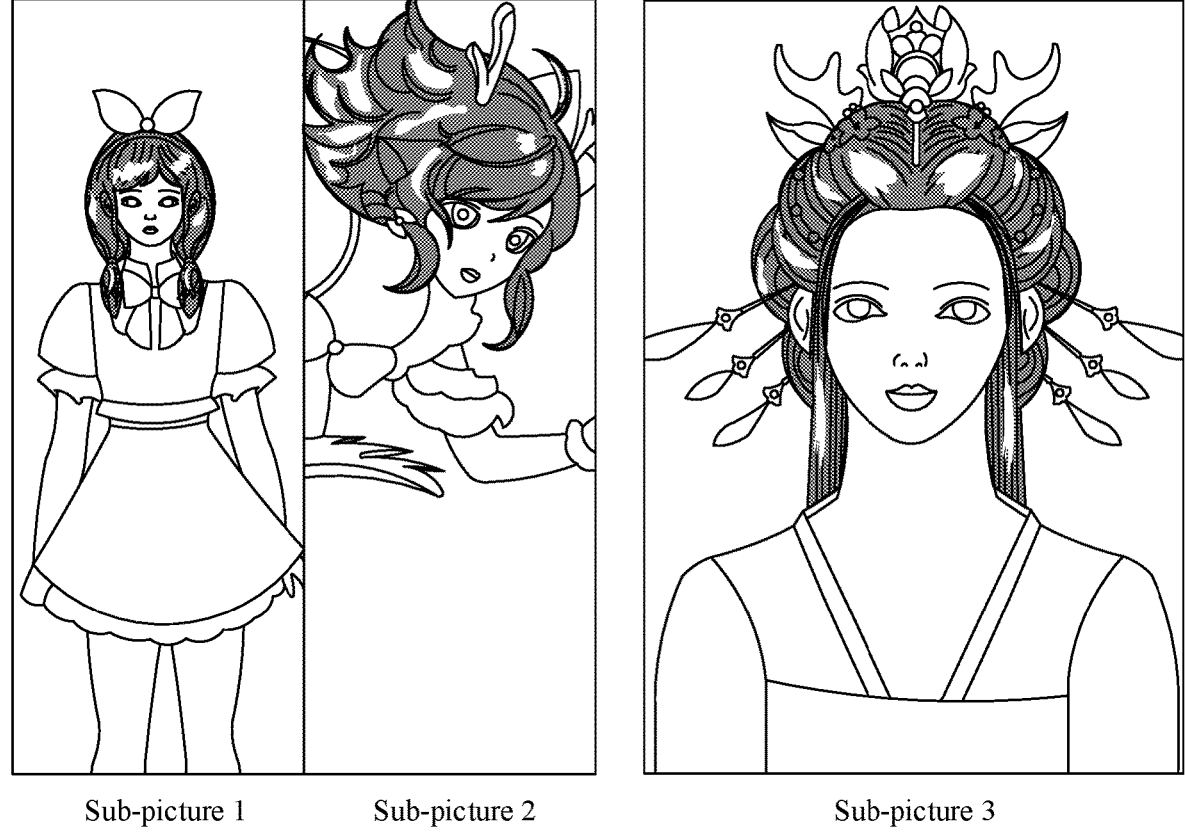
FIG. 14 is a schematic diagram of virtual image clothing matching a hair color according to an embodiment.

Further, the computer device matches the color of the rendered hair with the color of the clothing of the virtual image to obtain an image of the virtual image. In response to an export operation of the user, the image of the virtual image is imported into a target terminal, the image is re-designed through a client on the target terminal, and the re-designed image is uploaded to a social application client of the target terminal for display. As shown in FIG. 13, the image in FIG. 13 is the image uploaded to the social application client for display after re designing by the user. The hair color of the rendered hair and the clothing color in the image are both the color 1. In addition, the hair color is obtained based on the target coloring information, and the user can independently match the clothing of the virtual image, for example, matching a clothing type and a clothing color according to the hair color. FIG. 14 is a schematic diagram of virtual image clothing matching a hair color. Sub-pictures 1 and 2 in FIG. 14 are images obtained by the user by matching the clothing of the virtual image according to the hair color of the rendered hair of the virtual image. A sub-picture 3 shows purchase information of a virtual image in a game client display interface. The purchase information includes a hair color and clothing of the virtual image. In actual use, the game client can sell advanced suits, hair colors, and hairstyles as purchase information.

In this embodiment, the coloring information of the same pixel corresponding to each light source is fused, so that the gloss effect of the pixel can be further enriched, to ensure realistic and efficient rendering of the hair of the virtual image. In this way, the function of hair rendering is greatly optimized.

The disclosure further provides an application scenario in which the foregoing hair rendering method is applied. In some embodiments, the application of the hair rendering method in the application scenario can be provided as follows: In the game client scenario, to achieve efficient and realistic hair rendering on the client, the color information is determined according to the actual art requirements, and a rich gloss design is made through the open illumination information, to achieve high-performance rendering of the hair of the virtual image. In some embodiments, main light source information of a virtual main light source disposed in a virtual environment is obtained, the main light source information including a light source position and a light source direction that change with time, and the virtual main light source acting on a hair area of a virtual image; a longitudinal angle, an azimuthal angle, illumination information, and color information that are of a pixel in the hair area corresponding to each optical path of the virtual main light source are obtained, optical paths of the virtual main light source including a reflection optical path, a transmission transmission optical path, and a transmission reflection transmission optical path; for each optical path, a longitudinal scattering amount is determined based on the corresponding longitudinal angle and the corresponding illumination information of the pixel, an azimuthal scattering amount is determined based on the corresponding azimuthal angle, and a scattering amount of the pixel corresponding to the optical path is determined according to the longitudinal scattering amount, the azimuthal scattering amount, and the corresponding color information; and scattering amounts of the pixel corresponding to the optical paths are fused to obtain coloring information of the pixel corresponding to the virtual main light source, the coloring information being configured for rendering hair of the virtual image.

Certainly, it is not limited to this. The hair rendering method provided in the disclosure can also be applied in other application scenarios. For example, in a multimedia scenario, rendering of virtual images in various multimedia is often involved, such as virtual images in animated videos and virtual images used for promotion in promotional videos. To present a realistic virtual image in multimedia, the hair rendering method of the disclosure can be used to efficiently render the hair of the virtual image to obtain a realistic virtual image.

The foregoing application scenarios are schematic illustrations. It can be understood that the application of the hair rendering method provided in the embodiments of the disclosure is not limited to the foregoing scenarios.

In a specific embodiment, a hair rendering method is provided. The method may be performed by a computer device. In some embodiments, main light source information of a virtual main light source disposed in a virtual environment is obtained, the main light source information including a light source position and a light source direction that change with time, and the virtual main light source acting on a hair area of a virtual image. A longitudinal angle, an azimuthal angle, illumination information, and color information that are of a pixel in the hair area corresponding to each optical path of the virtual main light source are obtained, optical paths of the virtual main light source including a reflection optical path, a transmission transmission optical path, and a transmission reflection transmission optical path. Illumination information of the reflection optical path includes longitudinal illumination information. The longitudinal angle includes an incident longitudinal angle and a scattering longitudinal angle. For the reflection optical path, a longitudinal scattering amount is determined based on the corresponding longitudinal angle of the pixel and the longitudinal illumination information. A difference between a scattering azimuthal angle and an incident azimuthal angle is calculated; and a cosine value of the difference is used as an azimuthal scattering amount of the pixel corresponding to the reflection optical path. A mean deviation between the scattering longitudinal angle and the incident longitudinal angle of the reflection optical path is calculated. A product of the longitudinal scattering amount, the azimuthal scattering amount, and the corresponding color information is calculated. A scattering amount of the pixel corresponding to the reflection optical path is calculated according to a cosine value of the mean deviation and the product, where the scattering amount of the reflection optical path is proportional to the product, and is inversely proportional to a square of the cosine value of the mean deviation. Illumination information of the transmission transmission optical path includes longitudinal illumination information and azimuthal illumination information. For the transmission transmission optical path, a longitudinal scattering amount is determined based on the corresponding longitudinal angle and the longitudinal illumination information, and an azimuthal scattering amount is determined based on the corresponding azimuthal angle and the azimuthal illumination information. A shadow map corresponding to the hair area is obtained, where the shadow map includes a shadow degree of each pixel, and the shadow degree represents whether there is a shadow at the pixel. A scattering amount of the pixel corresponding to the transmission transmission optical path is determined according to a product of a shadow degree of the pixel, the longitudinal scattering amount, the azimuthal scattering amount, and the corresponding color information. Illumination information of the transmission reflection transmission optical path includes longitudinal illumination information. For the transmission reflection transmission optical path, a longitudinal scattering amount is determined based on the corresponding longitudinal angle and the longitudinal illumination information, an azimuthal scattering amount is determined based on a cosine value of the corresponding azimuthal angle, and a mean deviation between the scattering longitudinal angle and the incident longitudinal angle of the transmission reflection transmission optical path is calculated. A product of the longitudinal scattering amount, the azimuthal scattering amount, and the corresponding color information is calculated. A scattering amount of the pixel corresponding to the transmission reflection transmission optical path is calculated according to a cosine value of the mean deviation and the product, where the scattering amount of the transmission reflection transmission optical path is proportional to the product, and is inversely proportional to a square of the cosine value of the mean deviation. Scattering amounts of the pixel respectively corresponding to the reflection optical path, the transmission transmission optical path, and the transmission reflection transmission optical path are fused to obtain coloring information of the pixel corresponding to the virtual main light source.

Virtual optical sources action on a same pixel further include a virtual backlight source and a camera light source. Backlight source information of a virtual backlight source disposed in the virtual environment is obtained, where the backlight source information includes a light source position and an illumination direction that change with time, the virtual backlight source acts on the hair area of the virtual image, and a horizontal projection direction of the illumination direction of the virtual backlight source is opposite to a horizontal projection direction of an illumination direction of the virtual main light source. A longitudinal angle, illumination information, and color information that are of a pixel in the hair area corresponding to each optical path of the virtual backlight source are obtained, where optical paths of the virtual backlight source include a reflection optical path and a transmission reflection transmission optical path. For each optical path corresponding to the virtual backlight source, a longitudinal scattering amount corresponding to the virtual backlight source is determined based on the corresponding longitudinal angle and the corresponding illumination information of the pixel, and a scattering amount of the pixel corresponding to the optical path is determined according to the longitudinal scattering amount corresponding to the virtual backlight source and the corresponding color information. Scattering amounts of the pixel respectively corresponding to the reflection optical path and the transmission reflection transmission optical path are fused to obtain coloring information of the pixel corresponding to the virtual backlight source, the coloring information being configured for rendering hair of the virtual image. Light source information of a camera light source disposed in the virtual environment is obtained, where the light source information includes a light source position and a light source direction that change with time, and the camera light source acts on the hair area of the virtual image. A longitudinal angle, illumination information, and color information that are of a pixel in the hair area corresponding to each optical path of the camera light source are obtained, where optical paths of the camera light source include a reflection optical path and a transmission reflection transmission optical path. For each optical path corresponding to the camera light source, a longitudinal scattering amount corresponding to the camera light source is determined based on the corresponding longitudinal angle and the corresponding illumination information of the pixel, and a scattering amount of the pixel corresponding to the optical path is determined according to the longitudinal scattering amount corresponding to the camera light source and the corresponding color information. Scattering amounts of the pixel respectively corresponding to the reflection optical path and the transmission reflection transmission optical path are fused to obtain coloring information of the pixel corresponding to the camera light source, the coloring information being configured for rendering hair of the virtual image. The coloring information of the virtual main light source, the coloring information of the virtual backlight source, and the coloring information of the camera light source corresponding to the same pixel are fused, to obtain target coloring information of the pixel, where the target coloring information is configured for rendering the hair of the virtual image.

In this embodiment, the main light source information of the virtual main light source disposed in the virtual environment is obtained, where the main light source information includes a light source position and a light source direction that change with time, and the virtual main light source acts on the hair area of the virtual image. The optical paths of the virtual main light source include a reflection optical path, a transmission transmission optical path, and a transmission reflection transmission optical path. A longitudinal angle, an azimuthal angle, illumination information, and color information that are of the pixel in the hair area corresponding to each optical path of the virtual main light source are obtained. For each optical path, a longitudinal scattering amount is determined based on the corresponding longitudinal angle and the corresponding illumination information, which can accurately predict the scattering situation of the pixel in the longitudinal scattering process. The azimuthal scattering amount can be directly determined based on the corresponding azimuthal angle, thereby accurately predicting the scattering situation of the pixel in the azimuthal scattering process. A scattering amount of the pixel corresponding to an optical path is determined according to a longitudinal scattering amount, an azimuthal scattering amount, and corresponding color information. In this way, based on longitudinal scattering, azimuthal scattering, and color information, gloss of the pixel in each optical path can be authentically simulated. Finally, scattering amounts of the pixel respectively corresponding to the reflection optical path, the transmission transmission optical path, and the transmission reflection transmission optical path are fused to obtain coloring information of the pixel corresponding to the virtual main light source, realizing realistic and efficient rendering of the hair of the virtual character, and improving the hair rendering effect.

It is to be understood that, although the steps in the flowcharts of the foregoing embodiments are displayed sequentially according to instructions of arrows, these steps are not necessarily performed sequentially according to a sequence instructed by the arrows. Unless otherwise explicitly specified in the disclosure, execution of the steps is not strictly limited, and the steps may be performed in other sequences. In addition, at least some steps in the flowcharts of the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Based on the same inventive concept, an embodiment of the disclosure further provides a hair rendering apparatus for implementing the foregoing hair rendering method. The implementation solution to the problem provided in this apparatus is similar to the implementation solution described in the foregoing method. Therefore, for the specific limitations on one or more hair rendering apparatus embodiments provided below, refer to the foregoing limitations on the hair rendering method. Details are not described herein again.

Figure 15:
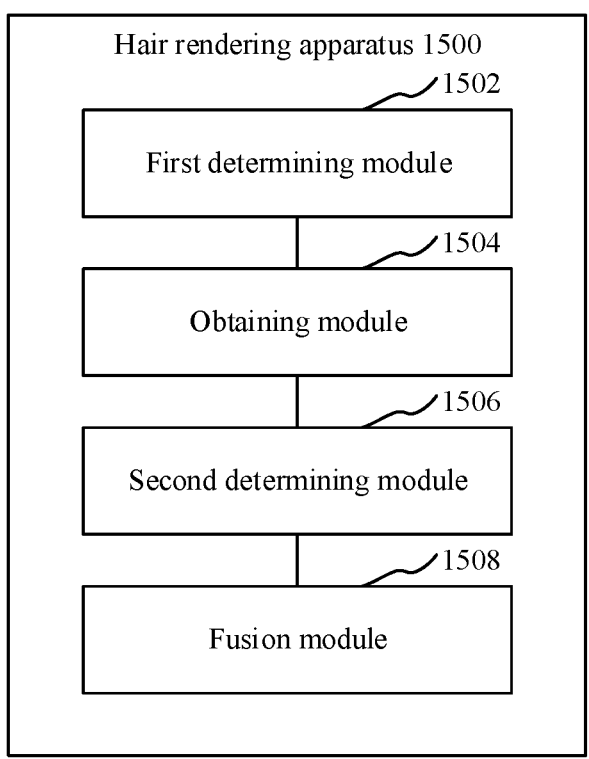
FIG. 15 is a structural block diagram of a hair rendering apparatus according to an embodiment.

In some embodiments, as shown in FIG. 15, a hair rendering apparatus 1500 is provided. The hair rendering apparatus 1500 can include a first determining module 1502, an obtaining module 1504, a second determining module 1506, and a fusion module 1508.

The first determining module 1502 is configured to obtain main light source information of a virtual main light source disposed in a virtual environment, the main light source information including a light source position and a light source direction that change with time, and the virtual main light source acting on a hair area of a virtual image.

The obtaining module 1504 is configured to obtain a longitudinal angle, an azimuthal angle, illumination information, and color information that are of a pixel in the hair area corresponding to each optical path of the virtual main light source, optical paths of the virtual main light source including a reflection optical path, a transmission transmission optical path, and a transmission reflection transmission optical path.

The second determining module 1506 is configured to determine, for each optical path, a longitudinal scattering amount based on the corresponding longitudinal angle and the corresponding illumination information of the pixel, determine an azimuthal scattering amount based on the corresponding azimuthal angle, and determine a scattering amount of the pixel corresponding to the optical path according to the longitudinal scattering amount, the azimuthal scattering amount, and the corresponding color information.

The fusion module 1508 is configured to fuse scattering amounts of the pixel corresponding to the optical paths to obtain coloring information of the pixel corresponding to the virtual main light source, the coloring information being configured for rendering hair of the virtual image.

In some embodiments, illumination information of the reflection optical path includes longitudinal illumination information. The second determining module is configured to determining, for the reflection optical path, a longitudinal scattering amount based on the corresponding longitudinal angle of the pixel and the longitudinal illumination information, determine an azimuthal scattering amount based on a cosine value of the corresponding azimuthal angle, and determine a scattering amount of the pixel corresponding to the reflection optical path according to the longitudinal scattering amount, the azimuthal scattering amount, and the corresponding color information.

In some embodiments, the longitudinal angle includes an incident longitudinal angle and a scattering longitudinal angle. The second determining module is configured to calculate a mean deviation between the scattering longitudinal angle and the incident longitudinal angle of the reflection optical path; calculate a product of the longitudinal scattering amount, the azimuthal scattering amount, and the corresponding color information; and calculate the scattering amount of the pixel corresponding to the reflection optical path according to a cosine value of the mean deviation and the product, where the scattering amount of the reflection optical path is proportional to the product, and is inversely proportional to a square of the cosine value of the mean deviation.

In some embodiments, the azimuthal angle includes an incident azimuthal angle and a scattering azimuthal angle. The second determining module is configured to calculate a difference between the scattering azimuthal angle and the incident azimuthal angle; and use a cosine value of the difference as the azimuthal scattering amount of the pixel corresponding to the reflection optical path.

In some embodiments, the optical paths of the virtual main light source further include a transmission transmission optical path, and illumination information of the transmission transmission optical path includes longitudinal illumination information and azimuthal illumination information. The second determining module is configured to determine, for the transmission transmission optical path, a longitudinal scattering amount based on the corresponding longitudinal angle of the pixel and the longitudinal illumination information, determine an azimuthal scattering amount based on the corresponding azimuthal angle and the azimuthal illumination information, and determine a scattering amount of the pixel corresponding to the transmission transmission optical path according to the longitudinal scattering amount, the azimuthal scattering amount, and the corresponding color information.

In some embodiments, the second determining module is configured to obtain a shadow map corresponding to the hair area, where the shadow map includes a shadow degree of each pixel, and the shadow degree represents whether there is a shadow at the pixel; and determine the scattering amount of the pixel corresponding to the transmission transmission optical path according to a product of a shadow degree of the pixel, the longitudinal scattering amount, the azimuthal scattering amount, and the corresponding color information.

In some embodiments, the optical paths of the virtual main light source further include a transmission reflection transmission optical path, and illumination information of the transmission reflection transmission optical path includes longitudinal illumination information. The second determining module is configured to determine, for the transmission reflection transmission optical path, a longitudinal scattering amount based on the corresponding longitudinal angle of the pixel and the longitudinal illumination information, determine an azimuthal scattering amount based on a cosine value of the corresponding azimuthal angle, and determine a scattering amount of the pixel corresponding to the transmission reflection transmission optical path according to the longitudinal scattering amount, the azimuthal scattering amount, and the corresponding color information.

In some embodiments, the longitudinal angle includes an incident longitudinal angle and a scattering longitudinal angle. The second determining module is configured to calculate a mean deviation between the scattering longitudinal angle and the incident longitudinal angle of the transmission reflection transmission optical path; calculate a product of the longitudinal scattering amount, the azimuthal scattering amount, and the corresponding color information; and calculate the scattering amount of the pixel corresponding to the transmission reflection transmission optical path according to a cosine value of the mean deviation and the product, where the scattering amount of the transmission reflection transmission optical path is proportional to the product, and is inversely proportional to a square of the cosine value of the mean deviation.

In some embodiments, the first determining module is further configured to obtain backlight source information of a virtual backlight source disposed in the virtual environment, where the backlight source information includes a light source position and an illumination direction that change with time, the virtual backlight source acts on the hair area of the virtual image, and a horizontal projection direction of the illumination direction of the virtual backlight source is opposite to a horizontal projection direction of an illumination direction of the virtual main light source; the obtaining module is further configured to obtain a longitudinal angle, illumination information, and color information that are of a pixel in the hair area corresponding to each optical path of the virtual backlight source, where optical paths of the virtual backlight source include a reflection optical path and a transmission reflection transmission optical path; the second determining module is further configured to determine, for each optical path corresponding to the virtual backlight source, a longitudinal scattering amount corresponding to the virtual backlight source based on the corresponding longitudinal angle and the corresponding illumination information of the pixel, and determine a scattering amount of the pixel corresponding to the optical path according to the longitudinal scattering amount corresponding to the virtual backlight source and the corresponding color information; and the fusion module is further configured to fuse scattering amounts of the pixel corresponding to the optical paths to obtain coloring information of the pixel corresponding to the virtual backlight source, the coloring information being configured for rendering hair of the virtual image.

In some embodiments, illumination information of the reflection optical path corresponding to the virtual backlight source includes longitudinal illumination information. The second determining module is further configured to obtain, for the reflection optical path of the virtual backlight source, the longitudinal scattering amount corresponding to the virtual backlight source according to the corresponding longitudinal angle of the pixel and the longitudinal illumination information through Gaussian calculation; and determine the scattering amount of the pixel corresponding to the reflection optical path according to a product of the longitudinal scattering amount corresponding to the virtual backlight source and the corresponding color information.

In some embodiments, the longitudinal angle includes an incident longitudinal angle and a scattering longitudinal angle. The second determining module is further configured to calculate a mean deviation between the scattering longitudinal angle and the incident longitudinal angle of the reflection optical path of the virtual backlight source; and determine the scattering amount of the pixel corresponding to the reflection optical path according to a cosine value of the mean deviation and the product, where the scattering amount of the reflection optical path is proportional to the product, and is inversely proportional to a square of the cosine value of the mean deviation.

In some embodiments, the optical paths of the virtual backlight source further include a transmission reflection transmission optical path, and illumination information of the transmission reflection transmission optical path includes longitudinal illumination information. The second determining module is further configured to obtain, for the transmission reflection transmission optical path of the virtual backlight source, the longitudinal scattering amount corresponding to the virtual backlight source according to the corresponding longitudinal angle of the pixel and the longitudinal illumination information through Gaussian calculation; and determine the scattering amount of the pixel corresponding to the transmission reflection transmission optical path according to a product of the longitudinal scattering amount and the corresponding color information.

In some embodiments, the first determining module is further configured to obtain light source information of a camera light source disposed in the virtual environment, where the light source information includes a light source position and a light source direction that change with time, and the camera light source acts on the hair area of the virtual image; the obtaining module is further configured to obtain a longitudinal angle, illumination information, and color information that are of a pixel in the hair area corresponding to each optical path of the camera light source, where optical paths of the camera light source include a reflection optical path and a transmission reflection transmission optical path; the second determining module is further configured to determine, for each optical path corresponding to the camera light source, a longitudinal scattering amount corresponding to the camera light source based on the corresponding longitudinal angle and the corresponding illumination information of the pixel, and determine a scattering amount of the pixel corresponding to the optical path according to the longitudinal scattering amount corresponding to the camera light source and the corresponding color information; and the fusion module is further configured to fuse scattering amounts of the pixel corresponding to the optical paths to obtain coloring information of the pixel corresponding to the camera light source, the coloring information being configured for rendering hair of the virtual image.

In some embodiments, illumination information of the reflection optical path corresponding to the camera light source includes longitudinal illumination information. The second determining module is further configured to obtain, for the reflection optical path of the camera light source, the longitudinal scattering amount corresponding to the camera light source according to the corresponding longitudinal angle of the pixel and the longitudinal illumination information through Gaussian calculation; and determine the scattering amount of the pixel corresponding to the reflection optical path according to a product of the longitudinal scattering amount corresponding to the camera light source and the corresponding color information.

In some embodiments, the optical paths of the camera light source include a transmission reflection transmission optical path, and illumination information of the transmission reflection transmission optical path includes longitudinal illumination information. The second determining module is configured to obtain, for the transmission reflection transmission optical path of the camera light source, the longitudinal scattering amount corresponding to the camera light source according to the corresponding longitudinal angle of the pixel and the longitudinal illumination information through Gaussian calculation; and determine the scattering amount of the pixel corresponding to the transmission reflection transmission optical path according to the longitudinal scattering amount corresponding to the camera light source and the corresponding color information.

In some embodiments, virtual optical sources action on a same pixel further include a virtual backlight source and a camera light source. The fusion module is further configured to fuse the coloring information of the virtual main light source, the coloring information of the virtual backlight source, and the coloring information of the camera light source corresponding to the same pixel, to obtain target coloring information of the pixel, where the target coloring information is configured for rendering the hair of the virtual image.

Each module in the foregoing hair rendering apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module In an embodiment, a computer device is provided. The computer device may be a server or a terminal, and an internal structure diagram thereof may be shown in FIG. 16. The computer device includes a processor, a memory, an input/output (I/O) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The input/output interface of the computer device is configured to exchange information between the processor and external devices. The communication interface of the computer device is configured to communicate with an external terminal via a network connection. The computer-readable instructions are executed by the processor to implement a hair rendering method.

Figure 16:
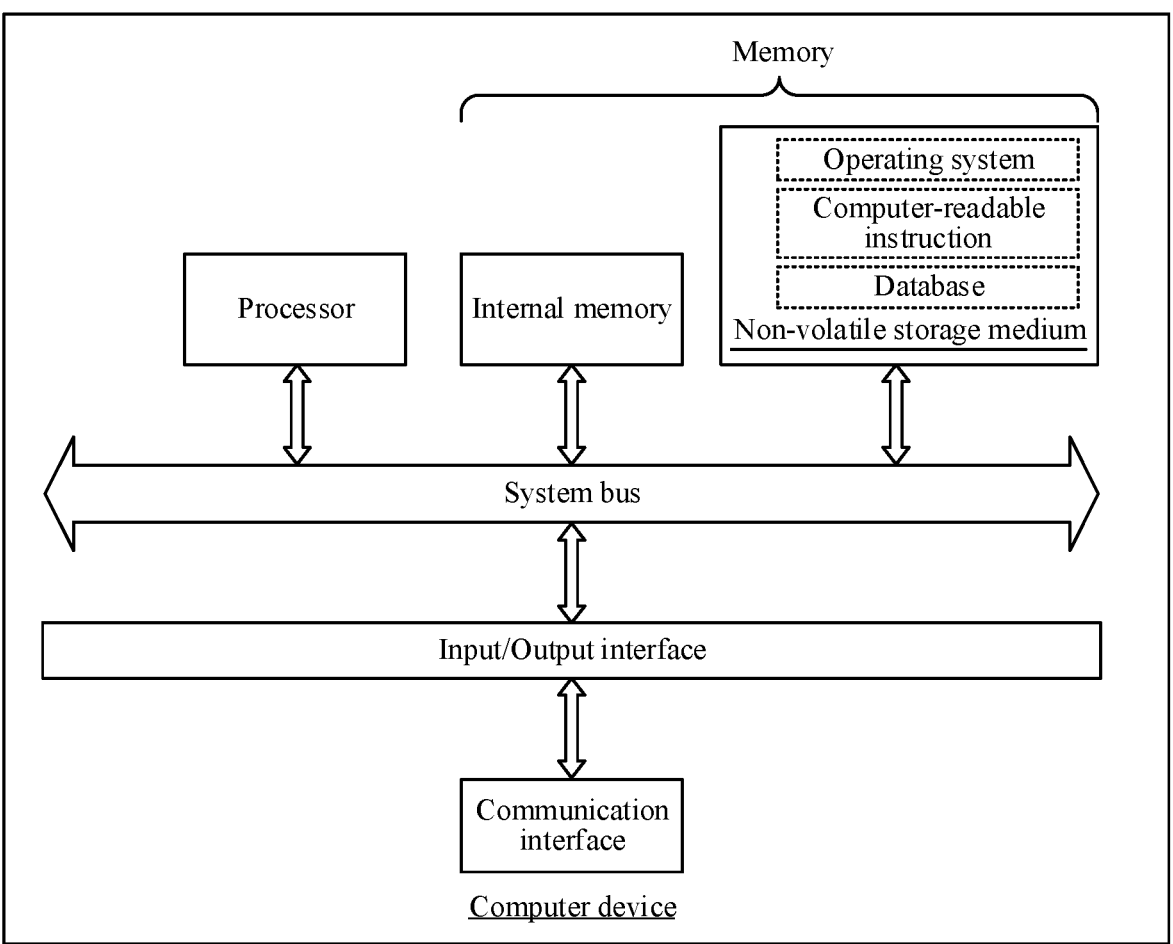
FIG. 16 is a diagram of an internal structure of a computer device according to an embodiment.

A person skilled in the art may understand that, the structure shown in FIG. 16 is a block diagram of a part of a structure related to a solution of the disclosure and does not limit the computer device to which the solution of the disclosure is applied. Specifically, the computer device may include more or fewer members than those in the drawings, or include a combination of some members, or include different member layouts.

In an embodiment, a computer device is further provided, including a memory and a processor, the memory storing computer-readable instructions, the processor, when executing the computer-readable instructions, implementing the steps in the foregoing method embodiments.

In an embodiment, a computer-readable storage medium, such as a non-transitory computer-readably storage medium, is provided, storing computer-readable instructions, the computer-readable instructions, when executed by a processor, implementing the steps in the foregoing method embodiments.

In an embodiment, a computer program product is provided, including computer-readable instructions, the computer-readable instructions, when executed by a processor, implementing the steps in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a database, or another medium used in the embodiments provided in the disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, or the like. The volatile memory may include a random access memory (RAM), an external cache, or the like. For the purpose of description instead of limitation, the RAM is available in a plurality of forms, such as a static RAM (SRAM) or a dynamic RAM (DRAM). The databases involved in various embodiments provided in the disclosure may include at least one of a relational database and a non-relational database. The non-relational database may include a blockchain-based distributed database, or the like, but is not limited thereto. The processor involved in various embodiments provided in the disclosure may be a general-purpose processor, a central processing unit, a graphics processing unit, a digital signal processor, a programmable logic device, a quantum computing-based data processing logic device, or the like, but is not limited thereto.

Technical features of the foregoing embodiments may be combined in various manners. To make the description more concise, not all possible combinations of the technical features in the foregoing embodiments are described. However, the combinations of these technical features shall be considered as falling within the scope recorded by this specification provided that no conflict exists.

The foregoing embodiments show several implementations of the disclosure, and descriptions thereof are in detail, but are not to be understood as a limitation to the patent scope of the disclosure. A person of ordinary skill in the art may further make several variations and improvements without departing from the ideas of the disclosure, and such variations and improvements all fall within the protection scope of the disclosure.

What is claimed is:

1. A hair rendering method, comprising:

obtaining main light source information of a virtual main light source disposed in a virtual environment, the main light source information including a light source position and a light source direction of the virtual main light source that change with time, and the virtual main light source acting on a hair area of a virtual image;

obtaining a longitudinal angle, an azimuthal angle, illumination information, and color information of a pixel in the hair area corresponding to each optical path of the virtual main light source, each optical path of the virtual main light source including a respective reflection optical path, a respective transmission optical path, and a respective transmission reflection transmission optical path;

determining, for each optical path of the virtual main light source, (i) a respective longitudinal scattering amount based on the corresponding longitudinal angle of the pixel and the corresponding illumination information of the pixel, (ii) a respective azimuthal scattering amount based on the corresponding azimuthal angle of the pixel, and (iii) a respective scattering amount of the pixel corresponding to the respective optical path according to the longitudinal scattering amount, the azimuthal scattering amount, and the corresponding color information of the pixel; and fusing scattering amounts of the pixel corresponding to the optical paths of the virtual main light source to obtain first coloring information of the pixel corresponding to the virtual main light source, hair in the hair area of the virtual image being rendered based on the first coloring information.

2. The method according to claim 1, wherein illumination information of a reflection optical path of the reflection optical paths comprises longitudinal illumination information, and the determining comprises:

determining, for the reflection optical path, (i) a longitudinal scattering amount based on the corresponding longitudinal angle of the pixel and the longitudinal illumination information of the reflection optical path, (ii) an azimuthal scattering amount based on a cosine value of the corresponding azimuthal angle of the pixel, and (iii) a scattering amount of the pixel corresponding to the reflection optical path according to the longitudinal scattering amount of the reflection optical path, the azimuthal scattering amount of the reflection optical path, and the corresponding color information of the pixel.

3. The method according to claim 2, wherein the longitudinal angle of the pixel comprises an incident longitudinal angle and a scattering longitudinal angle, and the determining the scattering amount of the pixel corresponding to the reflection optical path comprises:

calculating a mean deviation between the scattering longitudinal angle and the incident longitudinal angle of the pixel corresponding to the reflection optical path;

calculating a product of the longitudinal scattering amount of the reflection optical path, the azimuthal scattering amount of the reflection optical path, and the corresponding color information of the pixel; and calculating the scattering amount of the pixel corresponding to the reflection optical path according to (i) a cosine value of the mean deviation and (ii) the product, wherein the scattering amount of the pixel corresponding to the reflection optical path is proportional to the product and is inversely proportional to a square of the cosine value of the mean deviation.

4. The method according to claim 2, wherein the azimuthal angle of the pixel comprises an incident azimuthal angle and a scattering azimuthal angle, and the determining the azimuthal scattering amount based on the cosine value of the corresponding azimuthal angle comprises:

calculating a difference between the scattering azimuthal angle and the incident azimuthal angle; and setting a cosine value of the difference as the azimuthal scattering amount of the pixel corresponding to the reflection optical path.

5. The method according to claim 1, wherein illumination information of a transmission optical path of the transmission optical paths comprises longitudinal illumination information and azimuthal illumination information, and the determining comprises:

determining, for the transmission optical path, (i) a longitudinal scattering amount based on the corresponding longitudinal angle of the pixel and the longitudinal illumination information of the transmission optical path, (ii) an azimuthal scattering amount based on the corresponding azimuthal angle of the pixel and the azimuthal illumination information of the transmission optical path, and (iii) a scattering amount of the pixel corresponding to the transmission optical path according to the determined longitudinal scattering amount, the determined azimuthal scattering amount, and the corresponding color information of the pixel.

6. The method according to claim 5, wherein the determining the scattering amount of the pixel corresponding to the transmission optical path comprises:

obtaining a shadow map corresponding to the hair area of the virtual image, wherein the shadow map comprises a shadow degree of the pixel, and the shadow degree represents whether a shadow is positioned at the pixel; and determining the scattering amount of the pixel corresponding to the transmission optical path according to a product of the shadow degree of the pixel, the longitudinal scattering amount of the transmission optical path, the azimuthal scattering amount of the transmission optical path, and the corresponding color information of the pixel.

7. The method according to claim 1, wherein illumination information of a transmission reflection transmission optical path of the transmission reflection transmission optical paths comprises longitudinal illumination information, and the determining comprises:

determining, for the transmission reflection transmission optical path, (i) a longitudinal scattering amount based on the corresponding longitudinal angle of the pixel and the longitudinal illumination information of the transmission reflection transmission optical path, (ii) an azimuthal scattering amount based on a cosine value of the corresponding azimuthal angle of the pixel, and (iii) a scattering amount of the pixel corresponding to the transmission reflection transmission optical path according to the longitudinal scattering amount of the transmission reflection transmission optical path, the azimuthal scattering amount of the transmission reflection transmission optical path, and the corresponding color information of the pixel.

8. The method according to claim 7, wherein the longitudinal angle of the pixel comprises an incident longitudinal angle and a scattering longitudinal angle, and the determining the scattering amount of the pixel corresponding to the transmission reflection transmission optical path comprises:

calculating a mean deviation between the scattering longitudinal angle and the incident longitudinal angle of the pixel corresponding to the transmission reflection transmission optical path;

calculating a product of the longitudinal scattering amount of the transmission reflection transmission optical path, the azimuthal scattering amount of the transmission reflection transmission optical path, and the corresponding color information of the pixel; and calculating the scattering amount of the pixel corresponding to the transmission reflection transmission optical path according to (i) a cosine value of the mean deviation and (ii) the product, wherein the scattering amount of the pixel corresponding to the transmission reflection transmission optical path is proportional to the product and is inversely proportional to a square of the cosine value of the mean deviation.

9. The method according to claim 1, further comprising:

obtaining backlight source information of a virtual backlight source disposed in the virtual environment, wherein the backlight source information includes a light source position and an illumination direction that change with the time, the virtual backlight source acts on the hair area of the virtual image, and a horizontal projection direction of the illumination direction of the virtual backlight source is opposite to a horizontal projection direction of an illumination direction of the virtual main light source;

obtaining a longitudinal angle, illumination information, and color information of the pixel in the hair area corresponding to each optical path of the virtual backlight source, wherein each optical path of the virtual backlight source includes a respective reflection optical path and a respective transmission reflection transmission optical path;

determining, for each optical path corresponding to the virtual backlight source, (i) a respective longitudinal scattering amount corresponding to the virtual backlight source based on the corresponding longitudinal angle of the pixel and the corresponding illumination information of the pixel, and (ii) a respective scattering amount of the pixel corresponding to the respective optical path according to the longitudinal scattering amount corresponding to the virtual backlight source and the corresponding color information of the pixel; and fusing scattering amounts of the pixel corresponding to the optical paths of the virtual backlight source to obtain second coloring information of the pixel corresponding to the virtual backlight source, the hair in the hair area of the virtual image being rendered based on the second coloring information.

10. The method according to claim 9, wherein illumination information of a reflection optical path of the reflection optical paths corresponding to the virtual backlight source comprises longitudinal illumination information, and the determining comprises:

obtaining, for the reflection optical path of the virtual backlight source, the longitudinal scattering amount corresponding to the virtual backlight source according to the corresponding longitudinal angle of the pixel and the longitudinal illumination information of the reflection optical path through Gaussian calculation; and determining the scattering amount of the pixel corresponding to the reflection optical path according to a product of the obtained longitudinal scattering amount corresponding to the virtual backlight source and the corresponding color information of the pixel.

11. The method according to claim 10, wherein the longitudinal angle of the pixel comprises an incident longitudinal angle and a scattering longitudinal angle, and the determining the scattering amount of the pixel corresponding to the reflection optical path comprises:

calculating a mean deviation between the scattering longitudinal angle and the incident longitudinal angle of the pixel corresponding to the reflection optical path of the virtual backlight source; and determining the scattering amount of the pixel corresponding to the reflection optical path according to (i) a cosine value of the mean deviation and (ii) the product, wherein the scattering amount of the pixel corresponding to the reflection optical path is proportional to the product and is inversely proportional to a square of the cosine value of the mean deviation.

12. The method according to claim 9, wherein illumination information of a transmission reflection transmission optical path of the transmission reflection transmission optical paths comprises longitudinal illumination information, and the determining comprises:

obtaining, for the transmission reflection transmission optical path of the virtual backlight source, the longitudinal scattering amount corresponding to the virtual backlight source according to the corresponding longitudinal angle of the pixel and the longitudinal illumination information of the transmission reflection transmission optical path through Gaussian calculation; and determining the scattering amount of the pixel corresponding to the transmission reflection transmission optical path according to a product of the obtained longitudinal scattering amount and the corresponding color information of the pixel.

13. The method according to claim 1, further comprising:

obtaining light source information of a camera light source disposed in the virtual environment, wherein the light source information includes a light source position and a light source direction that change with the time, and the camera light source acts on the hair area of the virtual image;

obtaining a longitudinal angle, illumination information, and color information of the pixel in the hair area corresponding to each optical path of the camera light source, wherein each optical path of the camera light source includes a respective reflection optical path and a respective transmission reflection transmission optical path;

determining, for each optical path corresponding to the camera light source, (i) a respective longitudinal scattering amount corresponding to the camera light source based on the corresponding longitudinal angle of the pixel and the corresponding illumination information of the pixel, and (ii) a respective scattering amount of the pixel corresponding to the respective optical path according to the longitudinal scattering amount corresponding to the camera light source and the corresponding color information of the pixel; and fusing scattering amounts of the pixel corresponding to the optical paths of the camera light source to obtain third coloring information of the pixel corresponding to the camera light source, the hair in the hair area of the virtual image being rendered based on the third coloring information.

14. The method according to claim 13, wherein illumination information of a reflection optical path of the reflection optical paths corresponding to the camera light source comprises longitudinal illumination information, and the determining comprises:

obtaining, for the reflection optical path of the camera light source, the longitudinal scattering amount corresponding to the camera light source according to the corresponding longitudinal angle of the pixel and the longitudinal illumination information of the reflection optical path through Gaussian calculation; and determining the scattering amount of the pixel corresponding to the reflection optical path according to a product of the obtained longitudinal scattering amount corresponding to the camera light source and the corresponding color information of the pixel.

15. The method according to claim 13, wherein illumination information of a transmission reflection transmission optical path of the transmission reflection transmission optical paths comprises longitudinal illumination information, and the determining comprises:

obtaining, for the transmission reflection transmission optical path of the camera light source, the longitudinal scattering amount corresponding to the camera light source according to the corresponding longitudinal angle of the pixel and the longitudinal illumination information of the transmission reflection transmission optical path through Gaussian calculation; and determining the scattering amount of the pixel corresponding to the transmission reflection transmission optical path according to the obtained longitudinal scattering amount corresponding to the camera light source and the corresponding color information of the pixel.

16. The method according to claim 1, wherein a virtual backlight source and a camera light source further act on the hair area of the virtual image, and the fusing further comprises:

generating target coloring information of the pixel based on the first coloring information of the virtual main light source, second coloring information of the virtual backlight source, and third coloring information of the camera light source corresponding to the pixel, the hair in the hair area of the virtual image being rendered based on the target coloring information of the pixel.

17. A hair rendering apparatus, comprising:

processing circuitry configured to:

obtain main light source information of a virtual main light source disposed in a virtual environment, the main light source information including a light source position and a light source direction of the virtual main light source that change with time, and the virtual main light source acting on a hair area of a virtual image;

obtain a longitudinal angle, an azimuthal angle, illumination information, and color information of a pixel in the hair area corresponding to each optical path of the virtual main light source, each optical path of the virtual main light source including a respective reflection optical path, a respective transmission optical path, and a respective transmission reflection transmission optical path;

determine, for each optical path of the virtual main light source, (i) a respective longitudinal scattering amount based on the corresponding longitudinal angle of the pixel and the corresponding illumination information of the pixel, (ii) a respective azimuthal scattering amount based on the corresponding azimuthal angle of the pixel, and (iii) a respective scattering amount of the pixel corresponding to the respective optical path according to the longitudinal scattering amount, the azimuthal scattering amount, and the corresponding color information of the pixel; and fuse scattering amounts of the pixel corresponding to the optical paths of the virtual main light source to obtain first coloring information of the pixel corresponding to the virtual main light source, hair in the hair area of the virtual image being rendered based on the first coloring information.

18. The hair rendering apparatus according to claim 17, wherein illumination information of a reflection optical path of the reflection optical paths comprises longitudinal illumination information, and the processing circuitry is further configured to:

determine, for the reflection optical path, (i) a longitudinal scattering amount based on the corresponding longitudinal angle of the pixel and the longitudinal illumination information of the reflection optical path, (ii) an azimuthal scattering amount based on a cosine value of the corresponding azimuthal angle of the pixel, and (iii) a scattering amount of the pixel corresponding to the reflection optical path according to the longitudinal scattering amount of the reflection optical path, the azimuthal scattering amount of the reflection optical path, and the corresponding color information of the pixel.

19. The hair rendering apparatus according to claim 18, wherein the longitudinal angle of the pixel comprises an incident longitudinal angle and a scattering longitudinal angle, and the processing circuitry is configured to:

calculate a mean deviation between the scattering longitudinal angle and the incident longitudinal angle of the pixel corresponding to the reflection optical path;

calculate a product of the longitudinal scattering amount of the reflection optical path, the azimuthal scattering amount of the reflection optical path, and the corresponding color information of the pixel; and calculate the scattering amount of the pixel corresponding to the reflection optical path according to (i) a cosine value of the mean deviation and (ii) the product, wherein the scattering amount of the pixel corresponding to the reflection optical path is proportional to the product and is inversely proportional to a square of the cosine value of the mean deviation.

20. A non-transitory computer-readable storage medium storing instructions which when executed by a processor cause the processor to perform:

obtaining main light source information of a virtual main light source disposed in a virtual environment, the main light source information including a light source position and a light source direction of the virtual main light source that change with time, and the virtual main light source acting on a hair area of a virtual image;

obtaining a longitudinal angle, an azimuthal angle, illumination information, and color information of a pixel in the hair area corresponding to each optical path of the virtual main light source, each optical path of the virtual main light source including a respective reflection optical path, a respective transmission optical path, and a respective transmission reflection transmission optical path;

determining, for each optical path of the virtual main light source, (i) a respective longitudinal scattering amount based on the corresponding longitudinal angle of the pixel and the corresponding illumination information of the pixel, (ii) a respective azimuthal scattering amount based on the corresponding azimuthal angle of the pixel, and (iii) a respective scattering amount of the pixel corresponding to the respective optical path according to the longitudinal scattering amount, the azimuthal scattering amount, and the corresponding color information of the pixel; and fusing scattering amounts of the pixel corresponding to the optical paths of the virtual main light source to obtain first coloring information of the pixel corresponding to the virtual main light source, hair in the hair area of the virtual image being rendered based on the first coloring information.

* * * * *